US011200371B2

(12) United States Patent
Takesue

(10) Patent No.: US 11,200,371 B2
(45) Date of Patent: Dec. 14, 2021

(54) HAND-WRITTEN INFORMATION INPUTTING APPARATUS AND HAND-WRITTEN INFORMATION INPUTTING METHOD

(71) Applicant: Wacom Co., Ltd., Saitama (JP)

(72) Inventor: Shuichi Takesue, Saitama (JP)

(73) Assignee: Wacom Co., Ltd., Saitama (JP)

( * ) Notice: Subject to any disclaimer, the term of this patent is extended or adjusted under 35 U.S.C. 154(b) by 31 days.

(21) Appl. No.: 15/653,076

(22) Filed: Jul. 18, 2017

(65) Prior Publication Data
US 2018/0067913 A1 Mar. 8, 2018

(30) Foreign Application Priority Data
Sep. 2, 2016 (JP) .............................. JP2016-172214

(51) Int. Cl.
*G06F 3/00* (2006.01)
*G06F 40/174* (2020.01)
*G06F 3/0488* (2013.01)
*G06F 40/106* (2020.01)
*G06F 3/0354* (2013.01)
*G06K 9/00* (2006.01)

(52) U.S. Cl.
CPC ........ *G06F 40/174* (2020.01); *G06F 3/03545* (2013.01); *G06F 3/04883* (2013.01); *G06F 40/106* (2020.01); *G06K 9/00469* (2013.01)

(58) Field of Classification Search
USPC ................................ 715/201, 202, 230, 255
See application file for complete search history.

(56) References Cited

U.S. PATENT DOCUMENTS

| 5,629,499 | A | 5/1997 | Flickinger et al. |
| 2003/0229859 | A1* | 12/2003 | Shiraishi ................. G06F 3/016 715/273 |

(Continued)

FOREIGN PATENT DOCUMENTS

| JP | 2005-275599 A | 10/2005 |
| JP | 2006-107124 A | 4/2006 |

(Continued)

OTHER PUBLICATIONS

Japanese Office Action, dated Jul. 8, 2020, for Japanese Application No. 2016-172214, 10 pages. (With machine-generated English translation).

(Continued)

*Primary Examiner* — Kavita Stanley
*Assistant Examiner* — Jenq-Kang Chu
(74) *Attorney, Agent, or Firm* — Seed IP Law Group LLP

(57) ABSTRACT

A hand-written information inputting apparatus includes a receiving surface which, in operation, receives a paper sheet placed thereon, the paper sheet having printed thereon a document form including a writing region for hand-written input and identification information that identifies the document form, a position detection device which, in operation, detects a position indicated by an electronic pen in response to a hand-written inputting operation to the paper sheet, a reader device which, in operation, reads the identification information, a display device, and a control circuit which, in operation, decides, based on the identification information read by the reader device, whether document form information that corresponds to the paper sheet on which the document form is printed and that is displayable on the display device is acquirable through a communication network.

15 Claims, 21 Drawing Sheets

(56) References Cited

U.S. PATENT DOCUMENTS

| | | | | |
|---|---|---|---|---|
| 2006/0007189 A1* | 1/2006 | Gaines, III | ............ | G06K 9/222 |
| | | | | 345/179 |
| 2006/0217821 A1 | 9/2006 | Abraitis et al. | | |
| 2007/0283248 A1* | 12/2007 | Yoshida | .................. | G09F 9/372 |
| | | | | 715/273 |
| 2015/0043032 A1* | 2/2015 | Kyojima | .............. | G06K 15/181 |
| | | | | 358/1.15 |
| 2015/0153997 A1* | 6/2015 | Yoshida | .................. | G09F 9/372 |
| | | | | 345/107 |

FOREIGN PATENT DOCUMENTS

| | | | |
|---|---|---|---|
| JP | 2006-350927 A | 12/2006 |
| JP | 2010-102368 A | 5/2010 |
| KR | 10-2005-0046969 A | 5/2005 |

OTHER PUBLICATIONS

Korean Office Action, dated Apr. 14, 2021, for Korean Application No. 10-2017-0106820, 11 pages, (with English Translation).

\* cited by examiner

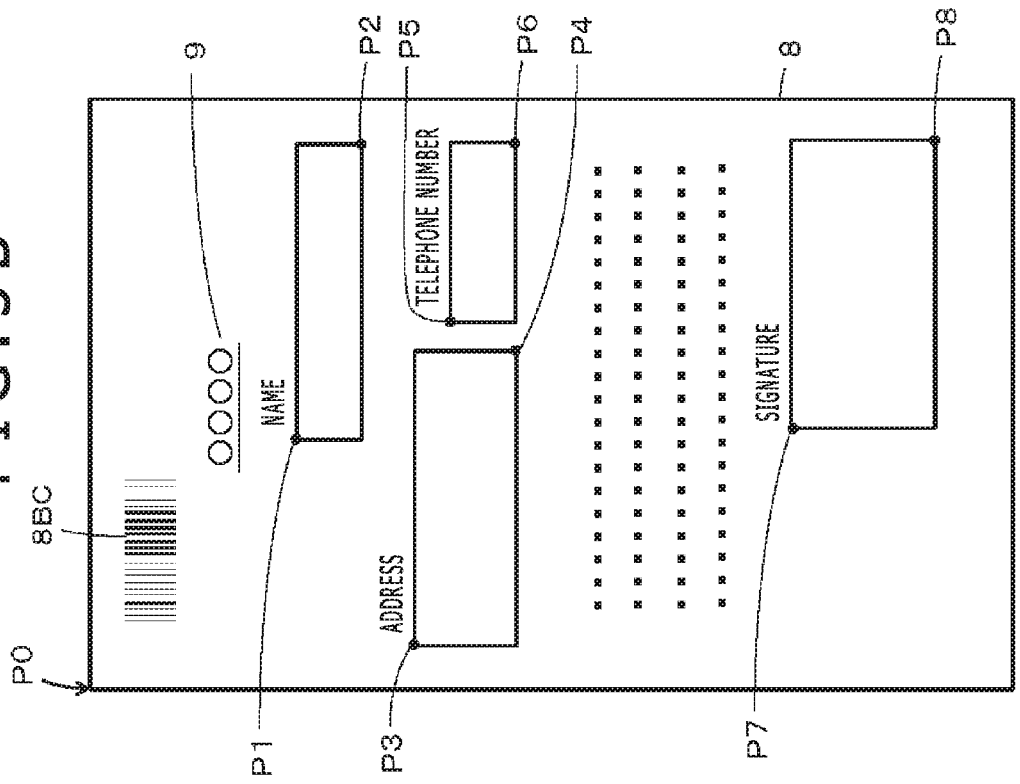
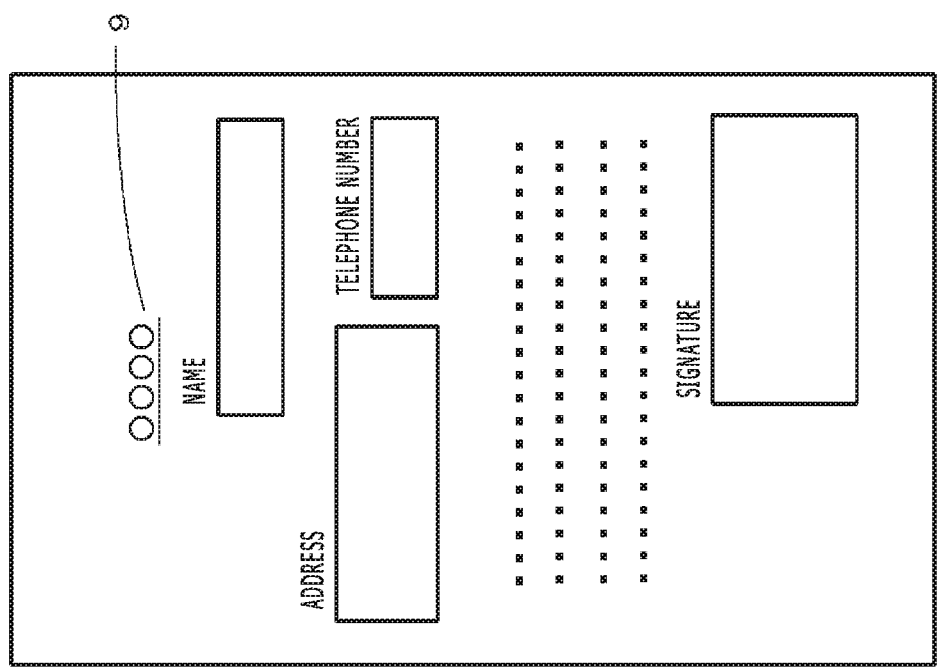

FIG. 6

| FORM NAME | PAPER ID | USER ID & USER NAME | DISPLAYING & PRINTING DATA | FILLING REGION ID | ITEM NAME | ITEM ATTRIBUTE | REGION COORDINATE DATA |
|---|---|---|---|---|---|---|---|
| ○○○○ | | PI-A ○○HOSPITAL | DT-A | A1 | NAME | TEXT | P1(X1, Y1), P2(X2, Y2) |
| | | | | A2 | ADDRESS | TEXT, ALPHANUMERIC CHARACTER | P3(X3, Y3), P4(X4, Y4) |
| | | | | A3 | TELEPHONE NUMBER | ALPHANUMERIC CHARACTER | P5(X5, Y5), P2(X6, Y6) |
| | | | | A4 | SIGNATURE | IMAGE | P7(X7, Y7), P8(X8, Y8) |
| □□□□ | | PI-A ○○HOSPITAL | DT-B | B1 | FOR PATIENT | TEXT | P9(X9, Y9), P10(X10, Y10) |
| | | | | B2 | FOR NURSE | TEXT | P11(X11, Y11), P12(X12, Y12) |
| | | | | B3 | FOR DOCTOR | TEXT | P13(X13, Y13), P14(X14, Y14) |

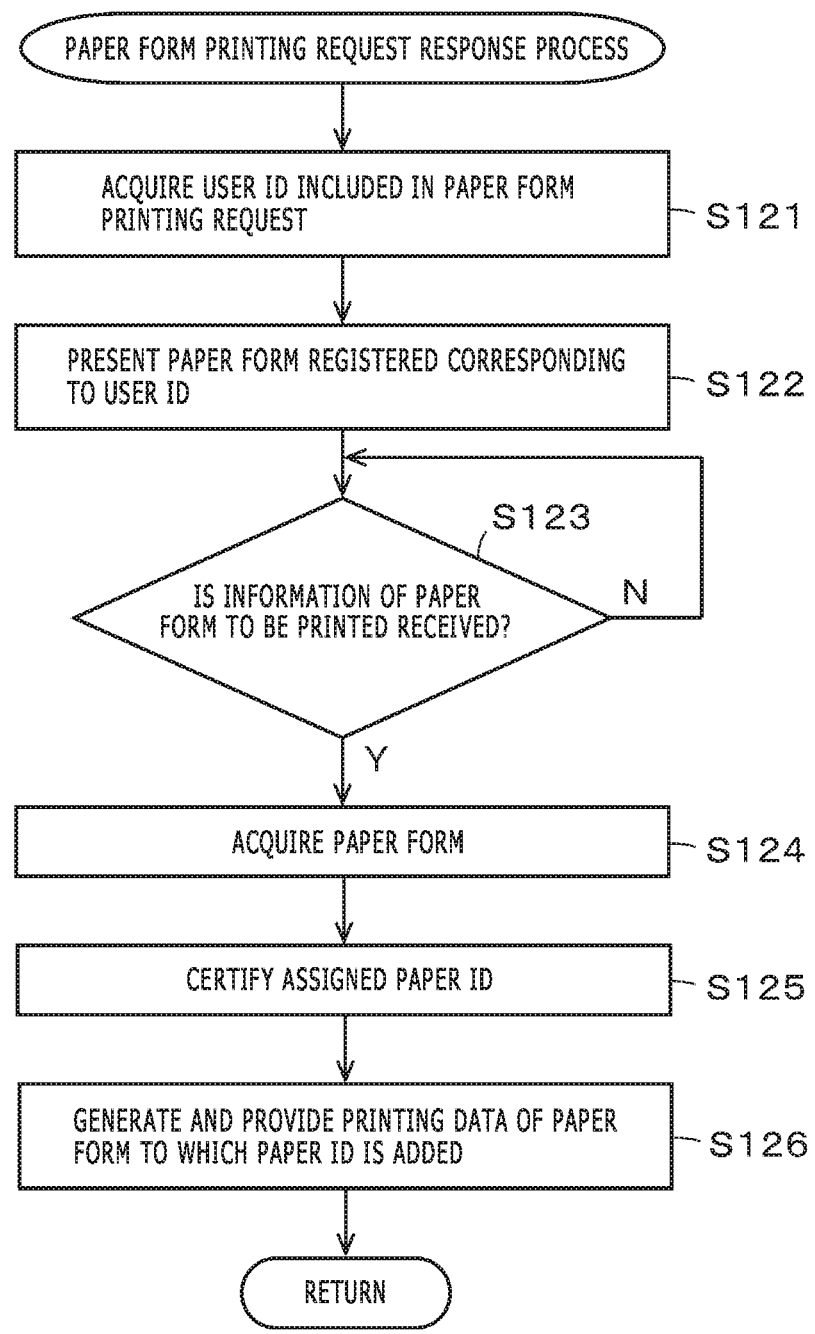

HAND-WRITTEN INFORMATION INPUTTING APPARATUS AND HAND-WRITTEN INFORMATION INPUTTING METHOD

BACKGROUND

Technical Field

The present disclosure relates to a hand-written information inputting apparatus and a hand-written information inputting method capable of writing on a paper sheet and acquiring information written on the paper sheet.

Description of Related Art

It has become popularized in accordance with a request for a paperless environment to use an electronic pen or the like to input, in place of performing hand-written inputting with a writing instrument such as a ballpoint pen or a pencil on a paper sheet, information to an inputting apparatus such as a tablet terminal, which has a position detection device including a sensor for detecting a position indicated by the electronic pen, such that the hand-written information inputted using the electronic pen is stored as electronic data.

However, this does not signify that an opportunity for hand-written inputting on a paper sheet with a writing instrument is lost, but it is the current situation that hand-written inputting on a paper sheet is required in various situations and besides there still remain many requirements for saving the paper sheet having the hand-written input.

Therefore, an inputting apparatus is conventionally provided wherein, when hand-written inputting is performed on a paper sheet placed on an inputting surface of a position detection device including a sensor using a writing instrument such as a ballpoint pen or a pencil or an electronic pen including a core body having a ballpoint pen function, the hand-written inputted written information is detected by the position detection device and stored as electronic data.

For example, Patent Document 1 (Japanese Patent Laid-Open No. 2006-107124) discloses that, when a manuscript is created by word processor software or the like and is printed on a paper sheet, image data of the printed manuscript is stored into a storage device of a tablet and, when the paper sheet on which the manuscript is printed is retouched with a writing instrument, an electronic writing locus (coordinate data) of the retouch is detected by a coordinate inputting circuit of the tablet and stored into the storage device. Consequently, in Patent Document 1, it is made possible to obtain an electronic document similar to the retouched printed manuscript by synthesizing the coordinate data stored in the storage device and the image data of the manuscript.

Meanwhile, Patent Document 2 (Japanese Patent Laid-Open No. 2010-102368) discloses a hand-written information processing system in which, on the basis of a hand-writing operation with a digital pen on a paper sheet for exclusive use on which a form including a dot pattern is printed, hand-written information or handwriting information is collected, personal information is authenticated based on the hand-written information and the hand-written information is utilized.

Incidentally, as a situation in which hand-written inputting is performed on a paper sheet with a writing instrument, a paper sheet is frequently used on which a document form is formed by printing such that a prescribed document, mark, image and so forth are disposed in advance and one or a plurality of inputting regions for hand-written information are disposed as blank spaces (blank regions).

For example, in a hospital or the like, a variety of document forms such as interview sheets, consent forms or acceptance forms for a surgical operation or inspection and round records are used. Such document forms have inputting regions for a name, an address, a signature and so forth and have also inputting regions for hand-written inputting limitatively by a specific person such as a patient, a nurse or a doctor.

Conventionally, hand-written information hand-written inputted to a paper sheet of any of such a variety of document forms is generally converted into electronic data by copying the hand-written information into inputting regions of an electronic document form, for example, by an operator using a word processor function of a personal computer or the like. Alternatively, such a process is performed as to read in hand-written information hand-written inputted to a paper sheet using an OCR (Optical Character Recognition) apparatus or the like to convert the hand-written information into electronic data and synthesize the electronic data into an electronic document form. Therefore, there is a problem that a high cost is required.

Therefore, if such an inputting apparatus as described above is available by which, when hand-written information is inputted to inputting regions for hand-written information of any of paper sheets on which such a variety of document forms are printed, electronic data of contents same as those of the paper sheet to which the hand-written information is inputted, namely, electronic data of the printed document form and the hand-written information are obtained, then the necessity for such a re-inputting process by an operator or an electronic conversion process in which an OCR apparatus is used as described above can be eliminated. Therefore, the cost can be reduced and it's very convenient.

However, a tablet which is the inputting apparatus of Patent Document 1 described hereinabove essentially requires a storage device for storing and keeping, when a manuscript of a document form is printed on a paper sheet, image data of the printed manuscript. Accordingly, where a variety of document forms are available, all of image data of the manuscript may be stored in the storage device, and therefore, a storage device of a large capacity is required for the storage device.

Further, in Patent Document 1, since it is a premise that image data of a form of a manuscript of a paper sheet which is placed on a tablet and to which hand-written inputting is to be performed is stored in advance in the storage device, there is no means for confirming whether or not a paper sheet placed on the tablet has printed thereon a form which is stored in the storage device. Therefore, if a paper sheet with regard to which image data of a form of a manuscript is not stored in the storage device is placed on the tablet and hand-written information is inputted to the paper sheet, then electronic data of the same contents as those of the paper sheet to which the hand-written information is inputted is not obtained. Therefore, there is a problem also that an initial object of the inputting apparatus cannot be achieved.

On the other hand, in the case of the form management system for a digital pen of Patent Document 2, a paper sheet for exclusive use which uses a dot pattern may be used. Further, it is necessary to use a special digital pen which can recognize the dot pattern of the paper sheet, and rather, a surplus cost is required. Therefore, the form management system has a problem that it is not realistic to use the same in a general situation in which such inputting of hand-written information as described above is required.

Also in the case of Patent Document 2, since confirmation means for confirming whether or not a paper sheet is a paper sheet for exclusive use whose form is stored in a database does not exist, if the paper sheet is not a paper sheet for exclusive use on which a form stored in the database and a coordinate information pattern (dot pattern) of the Anoto type are synthesized and printed, then even if hand-written information is inputted to the paper sheet, electronic data of contents same as those of the paper sheet to which the hand-written information is inputted is not obtained. Therefore, there is a problem also that the initial object cannot be achieved.

Accordingly, it may be desirable to provide a hand-written information inputting apparatus which can solve one or more of the problems described above.

BRIEF SUMMARY

According to the present disclosure, there is provided a hand-written information inputting apparatus including a receiving surface which, in operation, receives a paper sheet placed thereon, the paper sheet having printed thereon a document form including a writing region for hand-written inputting and identification information that identifies the document form, a position detection device which, in operation, detects a position indicated by an electronic pen that visibly writes on the paper sheet, in response to a hand-written inputting operation to the paper sheet placed on the receiving surface by the electronic pen, an identification information reader device which, in operation, reads the identification information printed on the paper sheet, a display device, and a control circuit which, in operation determines, based on the reader device, whether document form information that corresponds to the paper sheet on which the document form is printed and that is displayable on the display device is acquirable through a communication network. When the control circuit determines the document form information is acquirable through the communication network, the control circuit causes the display device to display the document form information acquired through the communication network and information corresponding to the position indicated by the electronic pen and detected by the position detection device. When the control circuit does not determine the document form information is acquirable through the communication network, the control circuit does not cause the display device to display the information corresponding to the position indicated by the electronic pen and detected by the position detection device.

The hand-written information inputting apparatus having the configuration described above reads, by the reader device thereof, the identification information printed on the paper sheet placed on the receiving surface, and acquires, based on the read identification information, a corresponding document form and displays the document form on a display screen of the display device. Thereupon, the control circuit decides whether the document form corresponding to the identification information is acquired successfully depending upon whether the document form is displayed successfully on the display screen of the display device. If it is decided that the document form is displayed successfully, then an inputting process of hand-written information by the electronic pen to the position detection device is enabled.

In particular, before hand-written inputting is performed to an inputting region for hand-written information of the paper sheet on which a predetermined document form is printed, the control circuit decides whether there exists electronic data of the document form printed on the paper sheet, and controls whether to enable an inputting process for hand-written information depending upon a result of the decision.

Accordingly, with the hand-written information inputting apparatus of the present disclosure, after a document form is displayed on the display screen of the display device and it is confirmed that corresponding electronic data of the document form is obtained successfully, inputting of hand-written information to the paper sheet can be accepted. Therefore, the initial object of the hand-written information inputting apparatus that electronic data of the same contents as those of the paper sheet to which hand-written information is inputted can be obtained with certainty can be achieved.

Further, in this case, the hand-written information inputting apparatus does not store the electronic data of the document form into a storage device in advance but acquires the electronic data of the document form on the basis of the identification information read by the reader device. Therefore, the document form is high in versatility, and there is no necessity for the hand-written information inputting apparatus to include a storage device of a great capacity.

Further, the identification information read by the reader device makes it easy to associate a document form printed on a paper sheet and electronic data of the document form with each other. Therefore, also it is easy to synthesize electronic data of hand-written information hand-written inputted by the electronic pen to an inputting region of the document form printed on the paper sheet and the electronic data of the document form. Therefore, there is no necessity to use such a paper sheet for exclusive use which uses a dot pattern as disclosed in Patent Document 2 or a digital pen for use with such a paper sheet for exclusive use as just described.

According to the present disclosure, before hand-written information is inputted to an inputting region for hand-written information of a paper sheet on which a predetermined document form is printed, presence of electronic data of the document form printed on the paper sheet can be confirmed. Therefore, the initial object of the hand-written information inputting apparatus that electronic data of the same contents as those of the paper sheet to which hand-written information is inputted can be obtained with certainty can be achieved.

BRIEF DESCRIPTION OF THE DRAWINGS

FIGS. 5A and 5B are views illustrating an example of a hand-written information inputting paper sheet used in the hand-written information inputting apparatus depicted in FIG. 1, according to one or more embodiments of the present disclosure;

FIG. 6 is a view illustrating a paper form database provided in the server apparatus depicted in FIG. 2, according to one or more embodiments of the present disclosure;

FIG. 7 is a flow chart illustrating an example of a process in the processing operations illustrated in FIG. 3, according to one or more embodiments of the present disclosure;

DETAILED DESCRIPTION

In the following, an embodiment of a hand-written information inputting apparatus and a hand-written information inputting method according to the present disclosure is described with reference to the drawings.

Figure 1:
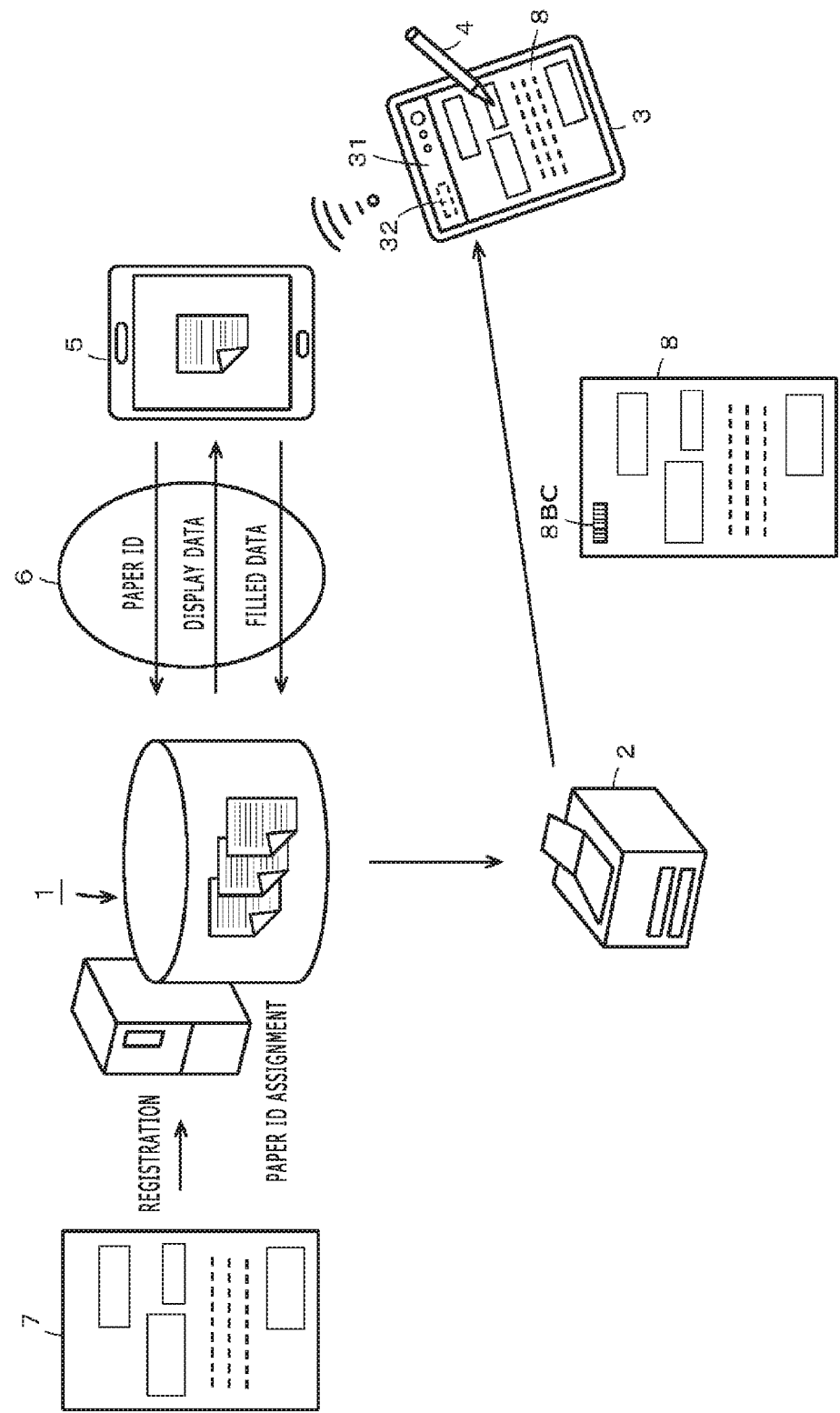
FIG. 1 is a view depicting an example of a configuration of a system including a hand-written information inputting apparatus according to one or more embodiments of the present disclosure.

FIG. 1 is a view depicting an outline of an example of a configuration of an example of a hand-written information management system including the embodiment of the hand-written information inputting apparatus according to the present disclosure. The hand-written information management system includes a document form and hand-written information management server apparatus (hereinafter referred to simply as server apparatus) 1, a printer 2, a tablet terminal 3 to which hand-written information is inputted, an electronic pen 4 for inputting hand-written information to the tablet terminal 3, and a mobile terminal 5 for communicating with the tablet terminal 3. It is to be noted that the mobile terminal 5, in operation, performs signal processing based on hand-written information inputted through the tablet terminal 3 performs cooperative processing with the server apparatus 1 through a communication network 6, and also it is possible to incorporate the mobile terminal 5 into the tablet terminal 3. The mobile terminal 5 and the server apparatus 1 are connected to each other through the communication network 6. The communication network 6 can be configured from a network including a public network such as the Internet or a mobile phone network. Alternatively, the communication network 6 may be a wireless LAN (Local Area Network) which uses Wi-Fi (Wireless Fidelity) (registered trademark). Alternatively, the communication network 6 may have a configuration of a LAN which connects the server apparatus 1 and the mobile terminal 5 to each other by wire connection.

In the present system, when hand-written information is inputted to a paper sheet on which a predetermined document form is printed, both of the paper sheet to which the hand-written information is inputted and electronic data of the information inputted by hand-writing to the document form printed on the paper sheet can be obtained simultaneously.

A user of the system would create a desired document form and register the document form into the server apparatus 1. In this case, the user may provide a paper sheet having a predetermined size to be used and having a desired document form printed thereon to the server apparatus 1 and issue a registration request to the server apparatus 1. Alternatively, the user may provide PDF (Portable Document Format) data, JPEG (Joint Photographic Experts Group) data, bit map data or document data of a different data format which is document data (which may be, for example, image data corresponding to the paper sheet) including the document form to the server apparatus 1 through the communication network 6 and issue a registration request to the server apparatus 1. In the present example, the size of the paper sheet corresponds to the size of a position detection area of a sensor provided in a position detection device of the tablet terminal 3 hereinafter described and is, in the present example, the "A4-size."

The server apparatus 1 accepts the registration request for the document form, assigns identification information to the accepted document form and registers necessary data into the database. In the case of the present example, the server apparatus 1 assigns identification information to a paper sheet which has the document form or, where each of a plurality of pages of paper sheets has a specific document form, to each page. This identification information is hereinafter referred to as paper ID (Identification). Further, in the description given below, the document form is referred to as paper form. In the present example, the server apparatus 1 assigns, for each paper form, unique identification information, in the present example, a unique barcode, as the paper ID.

Data to be stored as data of paper forms into the database of the server apparatus 1 include a paper sheet or each of a plurality of pages of paper sheets on which a paper form is drawn, printing data or displaying data corresponding to each of the paper sheets or the pages, region coordinate data indicative of an inputting region for hand-written information corresponding to the paper form, attribute data of information to be inputted to each inputting region for hand-written information and so forth. As hereinafter described, region coordinate data indicative of an inputting region for hand-written information included in a paper form are made to correspond to coordinate data of the position detection area of a sensor provided in the position detection device of the tablet terminal 3.

The server apparatus 1 provides, in response to a printing request from a user by whom a paper form is registered, a hand-written information inputting paper sheet 8 on which the registered paper form is printed by the printer 2 to the user. Alternatively, the server apparatus 1 transmits, in response to a printing request from a user by whom a paper form is registered, printing data of the registered paper form to a personal computer or the like of the user through the communication network 6. In this case, the user would use the printer 2 connected to the user's own personal computer to obtain a hand-written information inputting paper sheet 8 on which the registered paper form is printed.

In this case, on the hand-written information inputting paper sheet 8, a paper ID assigned by the server apparatus 1, in the present example, a barcode corresponding to the paper ID, is printed at a predetermined position. In particular, when the user tries to register a paper sheet 7 on which a paper form is printed into the server apparatus 1, the paper sheet 7 has no paper ID printed thereon as depicted in FIG. 1. However, a hand-written information inputting paper sheet 8 printed by the printer 2 in response to a printing request from the user has a barcode 8BC as a paper ID printed, in the present example, at a left upper end portion thereof.

It is to be noted that, in the system of the present example, the server apparatus 1 manages hand-written inputted hand-written information in an associated relationship with registered paper forms therein as hereinafter described. Therefore, upon registration of a paper form into the server apparatus 1, charging is performed. The charging may be performed for each one paper form or may be performed on the basis of a billing agreement by which a fixed amount of money is charged in a unit of a month or a year irrespective of the number of registered paper forms.

The hand-written information inputting paper sheet 8 on which the barcode 8BC is printed as the paper ID is used, in the embodiment of the hand-written information inputting apparatus of the present disclosure, as a paper sheet to which hand-written information is to be inputted.

In the present embodiment, the embodiment of the hand-written information inputting apparatus according to the present disclosure is configured from the tablet terminal 3, electronic pen 4 and mobile terminal 5. In the present embodiment, the tablet terminal 3 and the mobile terminal 5 are connected to each other by wireless communication of a near field communication standard such as, for example, the Bluetooth (registered trademark) standard. It is to be noted that the tablet terminal 3 and the mobile terminal 5 may be connected to each other by wireless connection by a different near field communication standard or may be connected to each other, for example, by a USB (Universal Serial Bus) cable.

Further, in the present embodiment, the electronic pen 4 and the tablet terminal 3 can exchange signals therebetween in accordance with an electromagnetic induction system. As hereinafter described, the position detection device of the tablet terminal 3 can detect the position indicated by the electronic pen 4 and can acquire writing pressure information or identification information from the electronic pen 4. In the following description, identification information for identifying each electronic pen 4 is referred to as pen ID.

The tablet terminal 3 includes a clip member 31 for locking a hand-written information inputting paper sheet 8 on a receiving surface formed on the inputting surface of the position detection device. The clip member 31 holds down and locks the hand-written information inputting paper sheet 8 such that it covers, in the present example, a region of an upper end of the hand-written information inputting paper sheet 8 including a portion at which the barcode 8BC is formed. Further, a barcode reader 32 which configures a reader device that reads a paper ID is provided on a surface of the clip member 31 opposite to the hand-written information inputting paper sheet 8.

The electronic pen 4 in the present embodiment, in operation, writes on a hand-written information inputting paper sheet 8 locked to the receiving surface of the tablet terminal 3 when used by a person in a manner similar to writing with a ballpoint pen, a pencil or the like. In the present example, the core body of the electronic pen 4 is configured similarly to a replacement core of a ballpoint pen such that it can viewably write on the hand-written information inputting paper sheet 8 similarly to writing by a ballpoint pen.

A position detection device including a sensor is disposed on the reverse side to the receiving surface of the tablet terminal 3. Thus, when information is written on the hand-written information inputting paper sheet 8 by the ballpoint pen writing function of the electronic pen 4, the position detection device of the tablet terminal 3 can simultaneously detect a writing locus as information (written data) of an indicated position by the electronic pen 4.

The mobile terminal 5 is an information processing apparatus including a display device having a display screen and has, in the present example, a configuration of, for example, a pad type terminal. Further, the mobile terminal 5 has installed therein an application program for performing processing necessary in the system in advance. Similarly, also the tablet terminal 3 has installed therein an application program for performing processing necessary in the system.

In particular, when a hand-written information inputting paper sheet 8 is locked by the clip member 31, the tablet terminal 3 reads the barcode 8BC as the paper ID printed on the hand-written information inputting paper sheet 8 by the barcode reader 32 and sends out the read barcode information to the mobile terminal 5.

If the mobile terminal 5 receives barcode information from the tablet terminal 3, then the mobile terminal 5 transmits the received barcode information or paper ID information corresponding to the barcode information to the server apparatus 1 through the communication network 6. Consequently, the server apparatus 1 decides whether or not a paper form corresponding to the paper ID is registered therein, and transmits, when it is decided that the paper form is not registered, a reply representing this to the mobile terminal 5. However, if it is decided that the paper form is registered, then the server apparatus 1 sends display data of the paper form stored in the database corresponding to the paper ID as a reply to the mobile terminal 5.

If the mobile terminal 5 receives a reply from the server apparatus 1 that a paper form corresponding to the paper ID is not registered, then it transmits preparation non-completion information indicating that it is not prepared for inputting of hand-written information to the tablet terminal 3. Further, if the mobile terminal 5 receives display data of a paper form corresponding to the paper ID from the server apparatus 1, then it displays the paper form according to the display data on the display screen and transmits preparation completion information indicating that it is prepared for inputting of hand-written information to the tablet terminal 3. Thereafter, the mobile terminal 5 enters an acceptance mode of data from the tablet terminal 3.

If the tablet terminal 3 receives information indicative of non-completion of preparations from the mobile terminal 5, then it does not perform detection operation of an indicated position by the electronic pen 4 or does not transmit information of a detected indicated position by the electronic pen 4 to the tablet terminal 3. On the other hand, if the tablet terminal 3 receives information indicative of completion of preparations from the mobile terminal 5, then it transmits, in response to detection of an indicated position by the electronic pen 4, information of the detected indicated position by the electronic pen 4 to the tablet terminal 3 together with additional information such as the pen ID and writing pressure information. At this time, the information of the indicated position by the electronic pen 4 is information hand-written inputted to an inputting region for hand-written information of the paper form.

Then, if the tablet terminal 3 receives an operation ending instruction from the user, then it sends the operation ending instruction to the mobile terminal 5, thereby ending the transmission of the information of the indicated position by the electronic pen 4 and the additional information such as the pen ID or the writing pressure information to the mobile terminal 5.

If the mobile terminal 5 receives information of an indicated position by the electronic pen 4 and additional information such as a pen ID or a writing pressure information from the tablet terminal 3, then it stores the received information into a buffer memory and displays the information hand-written inputted by the electronic pen 4 based on the information of the indicated position by the electronic pen 4 on the display screen. Then, if the mobile terminal 5 receives an operation ending instruction from the tablet terminal 3, then it transmits information (written information) of an indicated position by the electronic pen 4 and additional information such as a pen ID or writing pressure information, which have been received from the tablet terminal 3 till then and have been stored in the buffer memory, in an associated relationship with the paper ID to the server apparatus 1 and then issues a storage request for the filled data to the server apparatus 1. At this time, a timestamp is added to the written information to be transmitted from the mobile terminal 5 to the server apparatus 1. Consequently, even different pieces of hand-written input information associated with the same pen ID can be identified from each other with time information based on the timestamps.

The server apparatus 1 stores hand-written inputted information by the electronic pen 4 associated with the paper ID received from the mobile terminal 5 in an associated relationship with the received paper ID into the storage device for hand-written information.

If the server apparatus 1 receives a request for provision of registration information from a user, then it reads out information stored in an associated relationship with the paper ID and transmits the information to the mobile terminal 5. The mobile terminal 5 receives the information and causes the received information to be displayed identifiably on the screen on the basis of the timestamp. The user can confirm the information hand-written in the paper form or an operation instruction by hand-writing such as, for example, a check in a check box together with the paper form on the basis of the timestamp.

In this manner, in the hand-written information inputting apparatus of the present embodiment, that a paper form corresponding to a paper ID is stored in the server apparatus 1 is confirmed on the basis of whether or not data of the paper form can be acquired from the server apparatus 1, or in other words, on the basis of whether or not data of the paper form can be displayed on the display screen. Then, only when this is confirmed, the tablet terminal 3 is enabled to perform an inputting process of hand-written information to the hand-written information inputting paper sheet 8 locked by the clip member 31. Therefore, such a situation that, when hand-written information is inputted to the hand-written information inputting paper sheet 8, desired electronic data cannot be obtained does not occur.

Now, details of the components of the system of FIG. 1 are described further.

[Server Apparatus 1]

Figure 2:
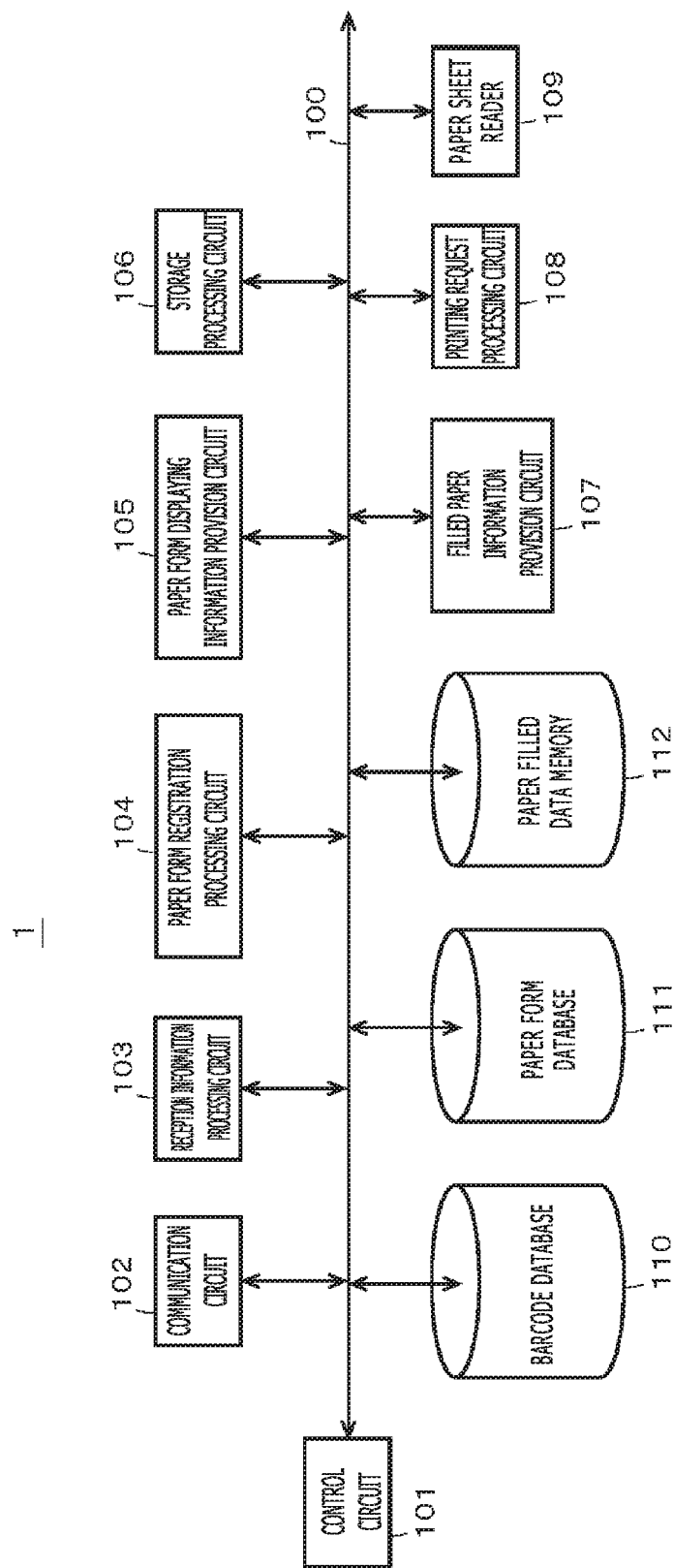
FIG. 2 is a block diagram depicting an example of a configuration of a server apparatus included in the system of the example of FIG. 1, according to one or more embodiments of the present disclosure.

FIG. 2 is a block diagram depicting an example of a configuration of the server apparatus 1. As depicted in FIG. 2, the server apparatus 1 of the present example is configured such that a communication circuit 102, a reception information processing circuit 103, a paper form registration processing circuit 104, a paper form displaying information provision circuit 105, a storage processing circuit 106, a filled paper information provision circuit 107, a printing request processing circuit 108, a paper sheet reader 109, a barcode database 110, a paper form database 111 and a paper filled data memory 112 are coupled to a control circuit 101, which is configured from a computer, through a system bus 100.

The communication circuit 102 is connected to the mobile terminal 5 through the communication network 6 to perform data communication for registration, transmission and so forth of a paper form.

The reception information processing circuit 103 decides reception information received through the communication circuit 102 and performs a process for transferring the reception information to pertaining components in response to a result of the decision.

The paper form registration processing circuit 104 performs, when it accepts a paper form registration request from a user through the reception information processing circuit 103, such a paper form registration acceptance process as hereinafter described in detail and stores data of the paper form whose registration is accepted into the paper form database 111. The paper form registration processing circuit 104 includes a data processing engine for detecting an inputting region for hand-written information from the data of the paper form accepted upon the registration request. In the paper form database 111, attribute information corresponding to inputting regions for configuring paper forms is defined and stored.

In each of the inputting regions (input items), position information indicative of the position of the inputting region and attributes of the inputting region or attributes of information to be inputted to the inputting region, namely, attributes regarding whether or not information inputting into each inputting region is essentially required, a dependency upon a different inputting region to which information is inputted depending upon an inputting region into which information is inputted, or whether or not information inputted to each inputting region is a text, a numeral, a Boolean (true or false) or a signature, or in what language is to be used for inputting, are registered in an associated relationship with each other. Accordingly, as hereinafter described, if a desired paper form is used to perform inputting of information including hand-written information to the tablet terminal 3, the mobile terminal 5 acquires attribute information corresponding to the paper form used in the mobile terminal 5 from the paper form database 111 of the server apparatus 1 on the basis of the paper ID and refers to the attribute information corresponding to the inputting regions individually configuring the paper form with reference to the input information transmitted from the tablet terminal 3. Through the reference to the attribute information, the tablet terminal 3 can perform processing regarding authority for permission or inhibition of inputting to each inputting region based on the pen ID assigned to an electronic pen used by an inputting person (writing person), dependency between inputting regions such as restriction of inputting of an input to a specific inputting region to a different inputting region, improvement in recognition accuracy or appropriateness of inputted information when text conversion or image recognition is performed, and so forth.

The paper form displaying information provision circuit 105 performs, when it receives a hand-written information inputting starting request from the mobile terminal 5 through the reception information processing circuit 103, a process for providing display data of a paper form corresponding to the paper ID from the mobile terminal 5.

The storage processing circuit 106 performs, when it receives a hand-written information storage request including a paper ID and hand-written inputted information from the mobile terminal 5 through the reception information processing circuit 103, a process that stores the paper ID and hand-written inputted information transmitted thereto from the mobile terminal 5 into the paper filled data memory 112.

The filled paper information provision circuit 107 synthesizes data of a paper form stored in the paper form database 111 corresponding to the paper ID and paper filled data (hand-written information) stored in the paper filled data memory 112 corresponding to the paper ID in response to a filled data providing request transferred thereto from the reception information processing circuit 103 to create filled paper information and transmits the filled paper information to the information request source.

The printing request processing circuit 108 performs, when it accepts a printing request of a registered paper form from a user through the reception information processing circuit 103, a process for creating a hand-written information inputting paper sheet 8 and providing the hand-written information inputting paper sheet 8 for printing to the user in accordance with the printing request. If a request for a hand-written information inputting paper sheet 8 itself is received from a user, then the printing request processing circuit 108 transmits information for printing by a printer such that a desired number of hand-written information inputting paper sheets 8 are printed and provided to the user.

The paper sheet reader 109 is a processing circuit for reading, when a user issues a paper form registration request in the form of a paper sheet on which a paper form desired by the user is printed, the paper sheet to form data of the paper form.

The barcode database 110 has stored therein information of barcodes as paper IDs to be assigned to paper forms.

The paper form database 111 stores data of registered paper forms together with attribute information thereof.

The paper filled data memory 112 is a memory that stores hand-written information transmitted thereto from the mobile terminal 5 in an associated relationship with the paper ID. It is to be noted that, in the paper filled data memory 112, information formed by synthesizing data of a paper form and hand-written information inputted to a hand-written information inputting region may be stored in an associated relationship with the paper ID. In this case, the filled paper information provision circuit 107 specifies a paper ID from a providing request for filled data transferred thereto from the reception information processing circuit 103, acquires filled data corresponding to the paper ID from the paper filled data memory 112 and transmits the acquired data to the requesting person side.

It is to be noted that the reception information processing circuit 103, paper form registration processing circuit 104, paper form displaying information provision circuit 105, storage processing circuit 106, filled paper information provision circuit 107 and printing request processing circuit 108 may be configured by the control circuit 101 (e.g., a microprocessor) executing instructions in accordance with a software program.

[Processing Operation of Server Apparatus 1]

Figure 3:
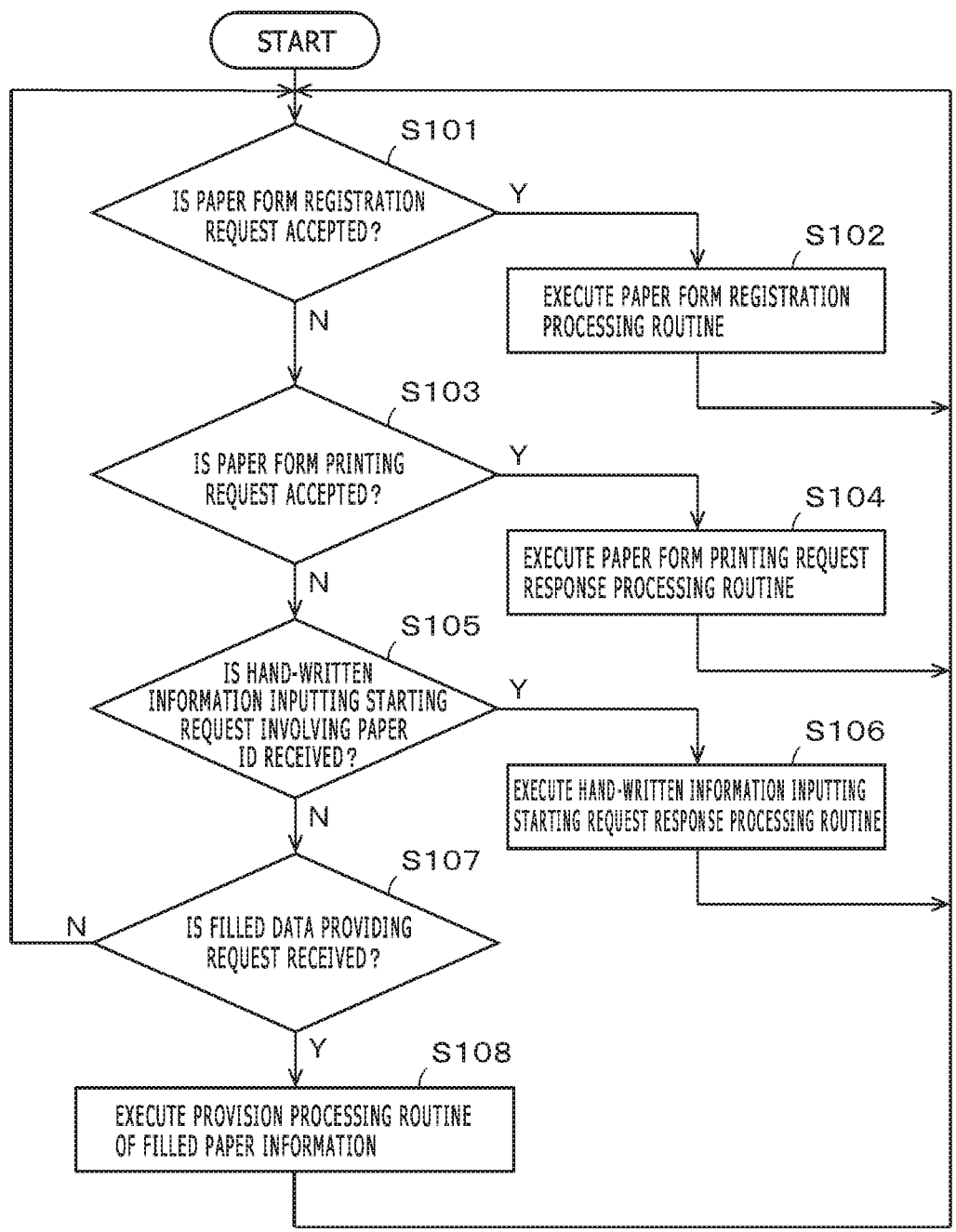
FIG. 3 is a flow chart illustrating an example of processing operations of the server apparatus depicted in FIG. 2, according to one or more embodiments of the present disclosure.

FIG. 3 is a flow chart illustrating a main routine of processing operations of the server apparatus 1. It is to be noted that the processing operations of the server apparatus 1 described below are described as processing operations where the reception information processing circuit 103, paper form registration processing circuit 104, paper form displaying information provision circuit 105, storage processing circuit 106, filled paper information provision circuit 107 and printing request processing circuit 108 are configured by the control circuit 101 executing instructions in accordance with a software program.

Figure 4:
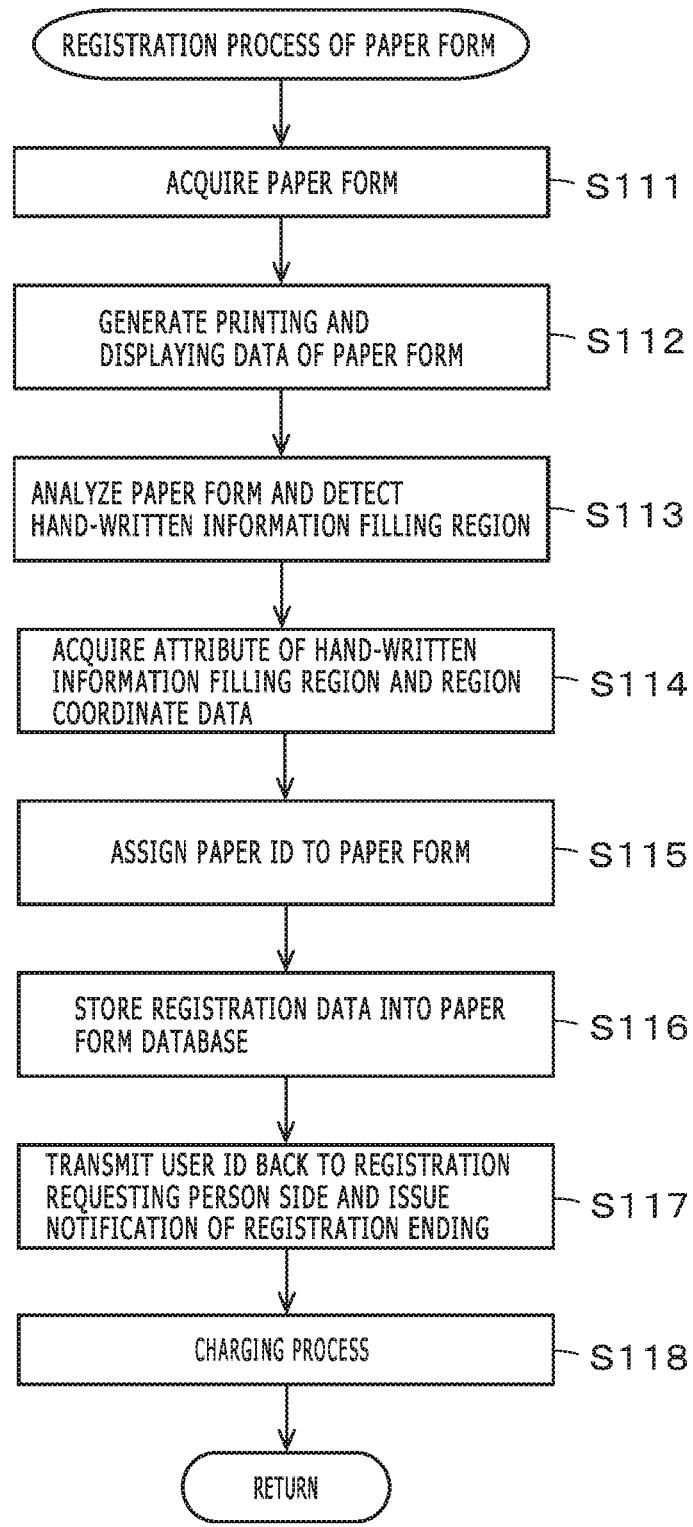
FIG. 4 is a flow chart illustrating a registration process of a paper form by the server apparatus depicted in FIG. 2, according to one or more embodiments of the present disclosure.

First, the control circuit 101 decides whether or not a paper form registration request is accepted (S101). Then, if it is decided that a paper form registration request is accepted, then the control circuit 101 executes a paper form registration processing routine (S102). Details of the paper form registration processing routine are hereinafter described (FIG. 4). After the paper form registration processing routine at S102 comes to an end, the control circuit 101 returns its processing to S101 and repeats the processing operations beginning at S101.

If it is decided at S101 that a paper form registration request is not accepted, then the control circuit 101 decides whether or not a paper form printing request is accepted (S103). If it is decided that a paper form printing request is accepted, then the control circuit 101 executes a paper form printing request response processing routine (S104). Details of the paper form printing request response processing routine are hereinafter described (FIG. 7). After the paper form printing request response processing routine at S104 comes to an end, the control circuit 101 returns its processing to S101 and repeats the processing operations beginning at S101.

Figure 8:
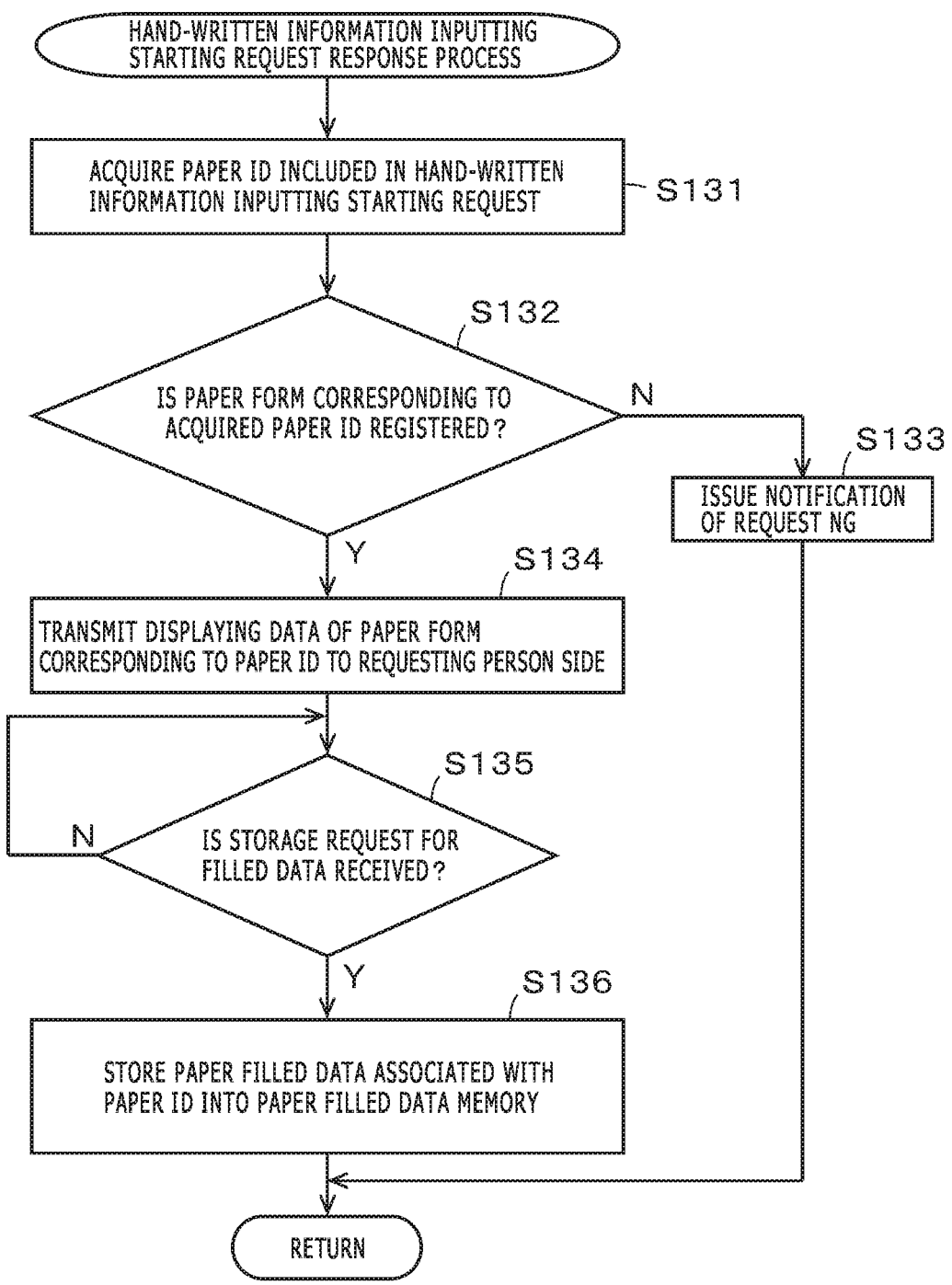
FIG. 8 is a flow chart illustrating an example of another process in the processing operations illustrated in FIG. 3, according to one or more embodiments of the present disclosure.

If it is decided at S103 that a paper form printing request is not accepted, then the control circuit 101 decides whether or not a hand-written information inputting starting request involving a paper ID is received (S105). If it is decided that a hand-written information inputting starting request is received, then the control circuit 101 executes a hand-written information inputting starting request response processing routine (S106). Details of the hand-written information inputting starting request response processing routine are hereinafter described (FIG. 8). After the hand-written information inputting starting request response processing routine at S106 comes to an end, the control circuit 101 returns its processing to S101 and repeats the processing operations beginning at S101.

If it is decided at S105 that a hand-written information inputting starting request is not received, then the control circuit 101 decides whether or not a filled data providing request is received (S107). If it is decided that a filled data providing request is received, then the control circuit 101 executes a filled data providing routine (S108). A corresponding filled data providing process is performed in which the filled paper information provision circuit 107 specifies a paper ID from the filled data providing request transferred from the reception information processing circuit 103, filled data corresponding to the paper ID from the paper filled data memory 112 and transfers the filled data to the requesting person side.

After the filled data providing process at S108 comes to an end, the control circuit 101 returns its processing to S101 and repeats the processing operations beginning at S101. Also when it is decided at S107 that a filled data providing request is not received, the control circuit 101 returns its processing to S101 and repeats the processing operations beginning at S101.

[Registration Processing Routine of Paper Form]

An example of the registration processing routine of a paper form at S102 described hereinabove is described with reference to a flow chart of FIG. 4 and to FIGS. 5A to 6. It is to be noted that the acceptance of a paper form registration request at S101 involves two cases including a case in which a registration request for paper form information as data is received through the communication circuit 102 and another case in which a paper form registration request based on that a paper sheet on which a paper form is printed is provided by the user is received. In the latter case, a paper sheet provided from the user is read by the paper sheet reader 109 and fetched into the server apparatus 1. Then, when a paper form registration request is accepted, the server apparatus 1 assigns identification information (hereinafter referred to as user ID) that identifies the user corresponding to the paper form registration request and manages the paper form registration request in an associated relationship with the accepted user name.

After the registration processing routine of a paper form is started, the control circuit 101 first acquires a paper form to be registered as depicted in FIG. 4 (S111). Then, the control circuit 101 generates printing and displaying data of the acquired paper form (S112).

Then, the control circuit 101 analyzes the acquired paper form to detect a hand-written information filling region which is blank and into which hand-written information is to be inputted (S113). Further, the control circuit 101 recognizes an attribute of the detected hand-written information filling region from the acquired paper form and acquires region coordinate data of the detected hand-written information filling region (S114).

As described hereinabove, in the present example, the size of a paper sheet whose paper form is to be registered corresponds to the size of the position detection area of the position detection device of the tablet terminal 3 and is, in the present example, the "A4-size." The region coordinate data of the hand-written information filling region corresponds to coordinate data detected by the position detection device of the tablet terminal 3. Accordingly, when a paper sheet on which a paper form is printed is mounted at a prescribed position of the tablet terminal 3, registered coordinate data in the hand-written information inputting region corresponds to coordinate data of the position detection device of the tablet terminal 3.

For example, the processes at S113 and S114 where the paper sheet on which a paper form whose registration is requested is printed is such a paper sheet as depicted in FIG. 5A are described. In particular, as depicted by the example of FIG. 5A, in the paper form, a writing region 9 for a form name representative of a name of an inputting paper sheet on which a paper form is printed such as, for example, an acceptance form, a consent form or an interview sheet is provided. Further, the paper form has set therein hand-written information filling regions for "name," "address," "telephone number," "signature" and so forth. At S113, the hand-written information filling regions are detected.

Then at S114, characters in the inputting items for "name," "address," "telephone number," "signature" and so forth corresponding to the hand-written information filling regions described in the proximity of the respective hand-written information filling regions are read to acquire attributes of the hand-written information filling regions, for example, as texts, alphanumeric characters, numerals or images. Further, at S114, region coordinate data which specify the hand-written information filling regions are acquired. In this case, since each of the individual hand-written information filling regions is, in the present example, a rectangular region, the region range of the hand-written information filling region can be specified by a left upper point and a right lower point of the rectangular region. In particular, if the left upper corner P0 of a paper sheet is defined as the origin of a coordinate system as depicted in FIG. 5B, for example, then the hand-written information filling regions for "name," "address," "telephone number" and "signature" can be specified by [P1(X1, Y1), P2(X2, Y2)], [P3(X3, Y3), P4(X4, Y4)], [P5(X5, Y5), P6(X6, Y6)] and [P7(X7, Y7), P8(X8, Y8)], respectively, each of which is a pair of two points including the left upper point and the right lower point of the rectangular region. Here, it can be recognized readily that, if the reference position P0 coincides with a reference position of the position detection circuit of the tablet terminal 3, then each coordinate corresponds to a coordinate of the position detection device of the tablet terminal 3.

It is to be noted that, although, in the example described above, attribute information or region coordinate data for the individual hand-written information filling regions is set automatically, it is a matter of course that such information or data may be set by manual inputting using a keyboard, a mouse or the like.

Subsequently to S114, the control circuit 101 assigns a paper ID to the paper form whose registration request is accepted (S115). In particular, in the present embodiment, since a barcode corresponding to a paper ID is assigned, the control circuit 101 acquires the barcode associated with the paper ID of the paper form from the barcode database 110 and assigns the barcode as a paper ID for the paper form whose registration request is accepted.

Thereafter, the control circuit 101 stores registration data including the display data of the paper form, data of the hand-written information inputting region and so forth in an associated relationship with the assigned paper ID into the paper form database 111 (S116).

FIG. 6 illustrates an example of storage data of the paper form database 111. The registration data illustrated in FIG. 6 is registration data in the case of the paper form of the example of FIGS. 5A and 5B. As illustrated in FIG. 6, the registration data includes a form name (an acceptance form, a consent form, an interview sheet or the like) of a paper form representative of a name of an inputting paper sheet, a barcode as a paper ID, a user ID and a user name, displaying-printing data, a filling region ID of a hand-written information inputting region, an item name-item attribute of the hand-written information inputting region, region coordinate data and so forth.

Subsequently to S116, the control circuit 101 transmits the user ID registered in the database back to the user from which the registration request for the paper form is received to notify the user of completion of the registration (S117). Then, the control circuit 101 performs charging in regard to the registration process of the paper form to the user (S118) and ends the registration processing routine for a paper form.

[Paper Form Printing Request Response Processing Routine]

An example of the paper form printing request response processing routine at S104 described hereinabove is described with reference to a flow chart of FIG. 7.

The control circuit 101 of the server apparatus 1 acquires the user ID included in the paper form printing request (S121), and reads out the paper form associated with the user ID stored in the paper form database 111 and provides, for example, a list of form names of the paper forms to the requesting person side (S122).

The user would receive the list of form names and select a paper form to be printed from within the received list. The control circuit 101 thus decides whether or not data which specifies the paper form selected by the user is received (S123). Then, if it is decided at S123 that data which specifies the selected paper form is received, then the control circuit 101 acquires the selected paper form from the paper form database 111 (S124).

Then, the control circuit 101 certifies the barcode as the paper ID assigned to the acquired paper form (S125), and generates printing data for the paper form to which the barcode is added and provides the printing data to the process side from which the printing request is received (S126). The process at S126 includes printing and providing the hand-written information inputting paper sheet 8 on the basis of the printing data generated by the printer 2 provided in the server apparatus 1.

An example of the hand-written information inputting paper sheet 8 provided in this manner is depicted in FIG. 5B. In particular, in the example of FIG. 5B, the barcode 8BC as the paper ID is printed at a left upper end portion of the hand-written information inputting paper sheet 8 as described hereinabove.

[Hand-Written Information Inputting Starting Request Response Process]

An example of the hand-written information inputting starting request response processing routine at S106 described hereinabove is described with reference to a flow chart of FIG. 8.

The control circuit 101 of the server apparatus 1 acquires a paper ID included in the hand-written information inputting starting request (S131) and refers to the paper form database 111 to decide whether or not a paper form registered in an associated relationship with the paper ID exists in the paper form database 111 (S132).

If it is decided at S132 that a registered paper form does not exist, then the control circuit 101 notifies the process, from which the request is received, of a request not granted (NG) which signifies rejection of the hand-written information inputting starting request (S133), thereby ending the processing routine.

On the other hand, if it is decided at S132 that a registered paper form exists, then the control circuit 101 transmits displaying data of the paper form corresponding to the paper ID to the process from which the request is received (S134).

Subsequently to S134, the control circuit 101 waits until it receives a storage request for filled data (S135). Then, if it is decided at S135 that a storage request for filled data is received, then the control circuit 101 stores the hand-written information inputted using the paper form associated with the paper ID into the paper filled data memory 112 (S136). Then, the present processing routine is ended.

[Embodiment of Hand-Written Information Inputting Apparatus]

As described hereinabove, in the present embodiment, the hand-written information inputting apparatus includes the tablet terminal 3, electronic pen 4 and mobile terminal 5. In the following, an example of a configuration of the tablet terminal 3, electronic pen 4 and mobile terminal 5 is described.

<Example of Configuration of Tablet Terminal 3>

Figure 9:
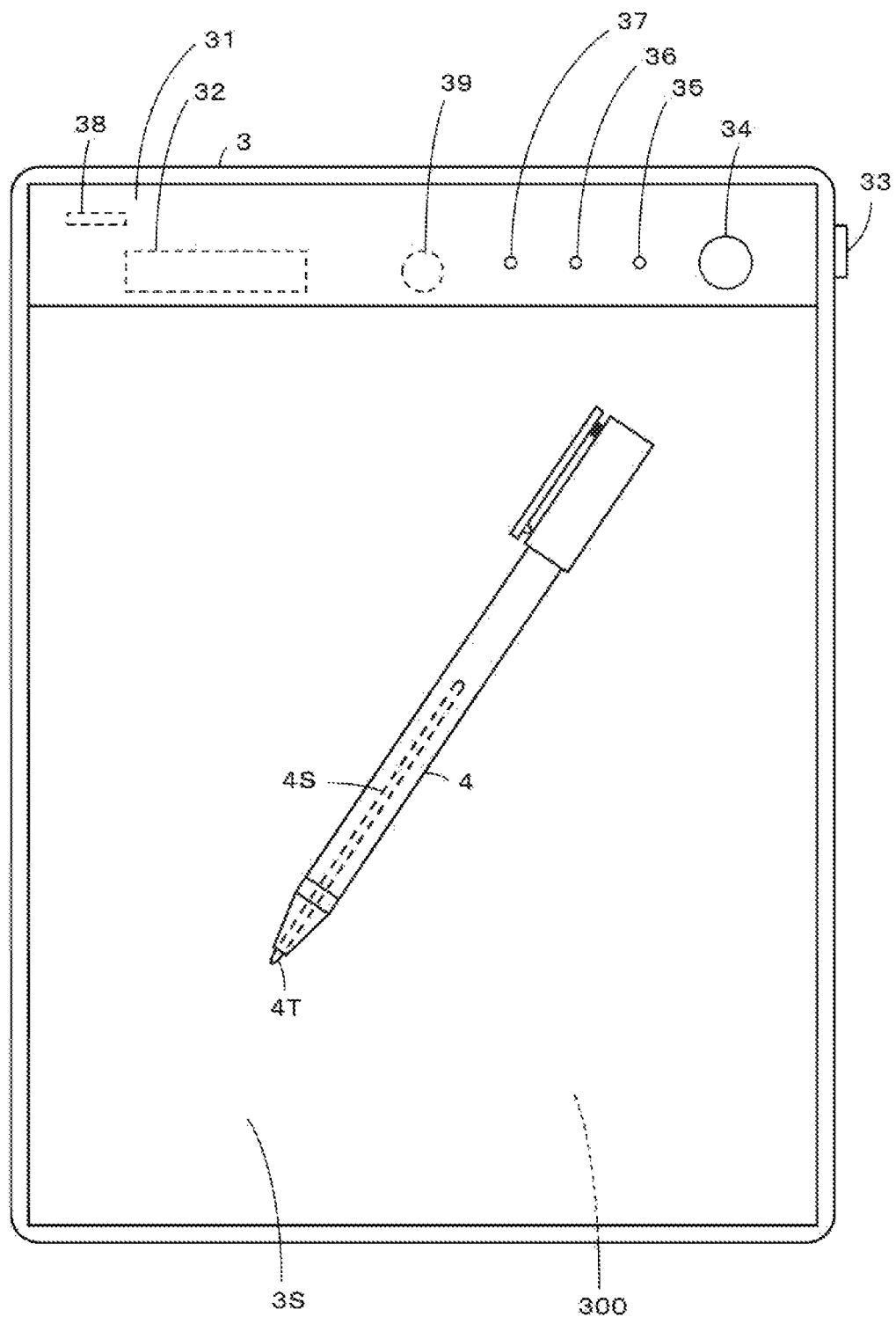
FIG. 9 is a view depicting an appearance of a tablet terminal which configures the hand-written information inputting apparatus depicted in FIG. 1, according to one or more embodiments of the present disclosure.
Figure 10A:
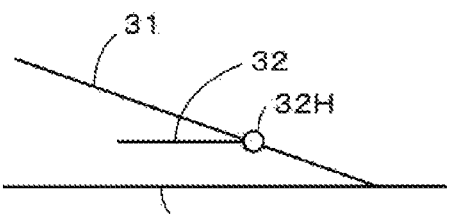
FIGS. 10A to 10E are schematic fragmentary views depicting a structure of the tablet terminal depicted in FIG. 9, according to one or more embodiments of the present disclosure.
Figure 10B:
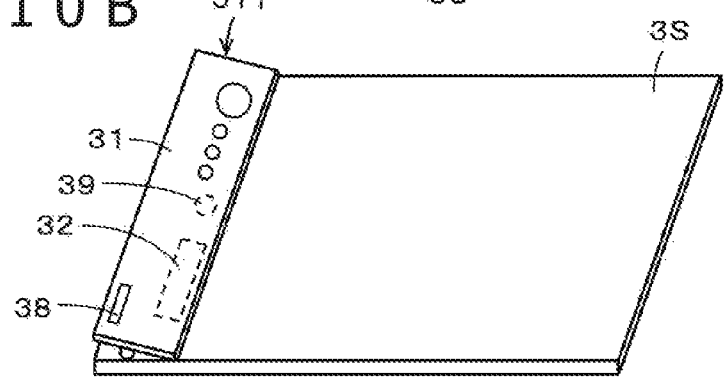
Figure 10C:
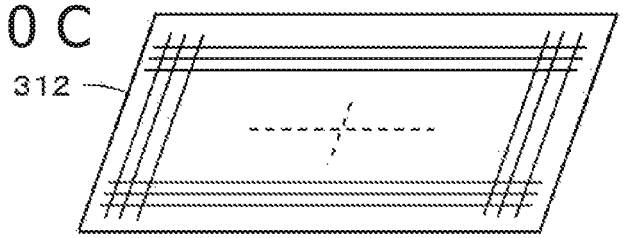
Figure 10D:
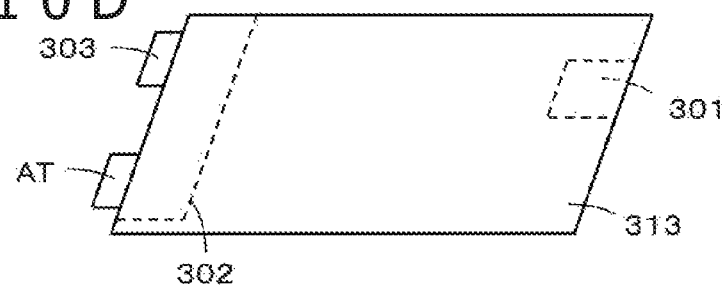
Figure 10E:
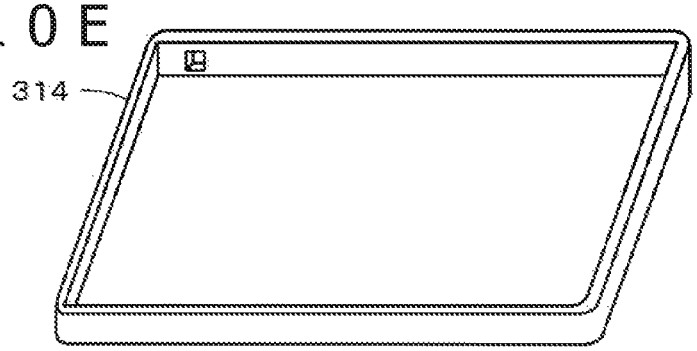

FIGS. 9 to 10E depict an example of a hardware configuration of the tablet terminal 3 in the present embodiment.

[Appearance and Basic Configuration of Tablet Terminal 3]

FIG. 9 is a view depicting an appearance of the tablet terminal 3 in the present embodiment. As depicted in FIG. 9, in the tablet terminal 3 in the present embodiment, an indication inputting surface by the electronic pen 4 is formed as a receiving surface 3S that receives a paper sheet placed thereon. Further, the tablet terminal 3 of the present example includes the clip member 31 which is provided at an upper end portion of the receiving surface 3S and holds down a paper sheet (hand-written information inputting paper sheet 8) to fix the paper sheet on the receiving surface 3S which is the indication inputting surface of the tablet terminal 3. The tablet terminal 3 thus has an appearance similar to a binder or the like that is used widely.

In the present embodiment, a position detection device 300 of the electromagnetic induction type is installed in the inside of the tablet terminal 3 on the reverse side of the receiving surface 3S. The electronic pen 4 can be used to perform inputting of coordinate data to the tablet terminal 3. The electronic pen 4 has a function (coordinate indication function) and cooperates with the position detection device 300 installed in the inside of the tablet terminal 3 to repetitively transmit a position detecting signal which can be received by the position detection device 300. Further, the electronic pen 4 has a core body 4S filled with a viewable ink and a tip portion (pen tip) 4T provided at an end portion of the core body 4S such that it has a function (ballpoint pen function) capable of viewably leaving handwriting on a paper sheet (hand-written information inputting paper sheet 8).

The electronic pen 4 in the present embodiment exchanges a signal with the sensor circuit of the position detection device 300 of the tablet terminal 3 by an electromagnetic induction system so as to allow an indicated position by the electronic pen 4 to be detected by the position detection device 300 of the tablet terminal 3. Since a known configuration of an electronic pen of the electromagnetic induction system can be used as the mechanical configuration of the electronic pen 4 in the present embodiment except that the core body has a ballpoint pen function, the mechanical configuration of the electronic pen 4 is not depicted in FIG. 9.

As depicted in FIG. 9, it is possible to visually write a character or a symbol or draw a picture using the ballpoint pen function of the electronic pen 4 on a paper sheet locked to the tablet terminal 3 by the clip member 31. At this time, from a signal transmitted at the same time from the electronic pen 4 toward the position detection device 300 by the coordinate indication function of the electronic pen 4, coordinate data as information of an indicated position corresponding to the handwriting formed on the paper sheet is detected by the position detection device 300 and transmitted as electronic data to the mobile terminal 5. The tablet terminal 3 in the present embodiment has a buffer memory (temporary storage device) for temporarily storing electronic data to be transmitted to the mobile terminal 5.

Coordinate data (written data) written at the position indicated by the electronic pen 4 and detected by the tablet terminal 3 can be transmitted by wireless transmission to the mobile terminal 5 through a controller and a wireless communication circuit incorporated in the tablet terminal 3 although details are hereinafter described. Accordingly, information written on the paper sheet can be acquired as coordinate data (written data) on the real time basis without such a labor as to fetch the information separately as electronic data by an image reader or the like.

Further, a power supply button 33 is provided on the tablet terminal 3 in the present embodiment. Though not depicted, the tablet terminal 3 includes a rechargeable battery such that, if the power supply button 33 is turned on, then a driving voltage is supplied from the battery.

The clip member 31 of the tablet terminal 3 is configured from a plate-like component and a spring member. The plate-like component has provided thereon an end button 34, a power indicator 35, a communication indicator 36, a preparation completion indicator 37 and a beep speaker 38. The power indicator 35, communication indicator 36 and preparation completion indicator 37 in the present example are each configured from an LED (Light Emitting Diode).

The power indicator 35 is provided for the information of a power on state. The communication indicator 36 is provided for the information of a state of wireless connection between the tablet terminal 3 and the mobile terminal 5. The preparation completion indicator 37 is provided for the confirmation of whether a paper form of a hand-written information inputting paper sheet 8 placed on the receiving surface 3S is registered in the server apparatus 1 and displayed on the display screen of the mobile terminal 5. The beep speaker 38 is provided for the information of various states to a user through a beep sound and may be used together with the information by the indicators 35 to 37 described above.

Further, the barcode reader 32, as an example of a reader device that reads a paper ID, is provided at the side of a surface of the plate-like member of the clip member 31 opposite the paper sheet placed on the receiving surface 3S. Further, at a portion of the tablet terminal 3 at which the plate-like member of the clip member 31 is positioned, a paper sheet mount sensor 39 that detects whether or not the paper sheet is in a state in which it is held and locked by the clip member 31 is provided.

The paper sheet mount sensor 39 optically detects whether or not a paper sheet is mounted. In the present example, one of a light source and a light receiving circuit is disposed on the receiving surface 3S side while the other of the light source and the light receiving circuit is disposed on the clip member 31 side such that whether or not a paper sheet is mounted is detected depending upon whether or not light is interrupted between the light source and the light receiving circuit by a paper sheet.

[Example of Hardware Configuration of Tablet Terminal 3]

FIGS. 10A to 10E are schematic fragmentary views depicting an example of a hardware configuration of the tablet terminal 3. As depicted in FIGS. 10A to 10E, the tablet terminal 3 includes, as principal components thereof, an upper cover (upper plate) 311 depicted in FIG. 10B, a sensor 312 depicted in FIG. 10C that detects a position indicated by the electronic pen 4, a shield sheet 313 depicted in FIG. 10D and a sensor cover 314 depicted in FIG. 10E disposed in order from above where the receiving surface 3S serving as an indication inputting surface is placed on the upper side. The sensor cover 314 positioned at the lowest position is formed from a synthetic resin, a metal or the like and is configured in a thin box shape having an opening at the top thereof. The shield sheet 313 and the sensor 312 are accommodated in the sensor cover 314.

The shield sheet 313 is formed from an electromagnetic sheet configured from a magnetic material and bonded together to a conductive sheet formed, for example, from ITO (Indium Tin Oxide), zinc oxide or tin oxide. The shield sheet 313 plays a role of preventing mixture of an unnecessary signal into the sensor 312 and eliminating leakage of magnetic fluxes generated from the sensor 312. The shield sheet 313 is provided such that it covers an overall area of a surface of the sensor 312 on the opposite side to the receiving surface 3S which serves also as the indication inputting surface of the sensor 312.

Although details of the configuration of the sensor 312 are hereinafter described, the sensor 312 includes a large number of loop coils which transmit a signal to the electronic pen 4 and receive a signal from the electronic pen 4.

The upper cover 311 is formed from a material which passes a signal (radio wave) transmitted from the electronic pen 4 therethrough, for example, from a synthetic resin, glass or ceramics. The surface of the upper cover 311 exposed to the outside forms the receiving surface 3S which serves also as the indication inputting surface of the position detection device.

The clip member 31 is provided at an upper end portion of the receiving surface 3S on which the upper cover 311 is placed as depicted also in FIG. 9 such that it cooperates with the receiving surface 3S of the upper cover 311 (indication inputting surface of the position detection device) to sandwich a paper sheet therebetween. The upper cover 311 covers and protects the sensor 312 and functions as a top plate on which a paper sheet is to be placed.

The size of the receiving surface 3S corresponds to the "A4-size" of a paper sheet, and the tablet terminal 3 in the present example has such a size that a wall portion of the sensor cover 314 projects to the periphery of the receiving surface 3S and acts as a position regulating member for the paper sheet. Accordingly, in the tablet terminal 3 of the present example, if a paper sheet is placed on the receiving surface 3S, then the placement position of the paper sheet is regulated by the wall portion of the sensor cover 314 such that, in a state in which the paper sheet is locked by the clip member 31, the paper sheet coincides with the indication inputting region of the sensor 312 of the position detection device of the tablet terminal 3.

The paper sheet is held by the clip member 31 of the upper cover 311 of the tablet terminal 3 in a state in which a plurality of paper sheets are piled up so as to have a predetermined thickness. Since the electronic pen 4 is of the electromagnetic induction type, even if a plurality of paper sheets of a predetermined thickness exist, the electronic pen 4 can exchange electromagnetic waves with the sensor 312.

Further, in the present example, the barcode reader 32 provided on the opposing surface of the clip member 31 of the tablet terminal 3 to the receiving surface 3S of the plate-like member is movably attached to the opposing surface of the clip member 31 by a hinge 32H as depicted in principle in FIG. 10A. Consequently, the reading surface of the barcode reader 32 is opposed in a normally parallel state to the surface of a paper sheet placed on the receiving surface 3S. Therefore, the barcode reader 32 can read the barcode 8BC printed on the hand-written information inputting paper sheet 8 with high reading accuracy irrespective of the thickness of the paper sheets placed on the receiving surface 3S.

Further, as depicted together with the shield sheet 313 in FIG. 10D, a coordinate data generation circuit 301 and a controller 302 are provided in an opposing relationship to the sensor 312 with the shield sheet 313 interposed therebetween. The coordinate data generation circuit 301 forms coordinate data on the basis of an output of the sensor 312. The controller 302 principally implements a controlling function that controls sending out of coordinate data generated by the coordinate data generation circuit 301 to the mobile terminal 5.

The controller 302 includes a wireless communication circuit, and a transmission antenna AT is provided for the wireless communication circuit. The transmission antenna AT is provided outside a region covered with the shield sheet 313 such that it can transmit coordinate data and so forth appropriately to the mobile terminal 5. To the controller 302, the power supply button 33, end button 34, indicators 35 to 37, beep speaker 38 and paper sheet mount sensor 39 described hereinabove are connected through a connector 303.

[Example of Configuration of Electronic Circuitry of Electronic Pen 4 and Tablet Terminal 3]

Figure 11:
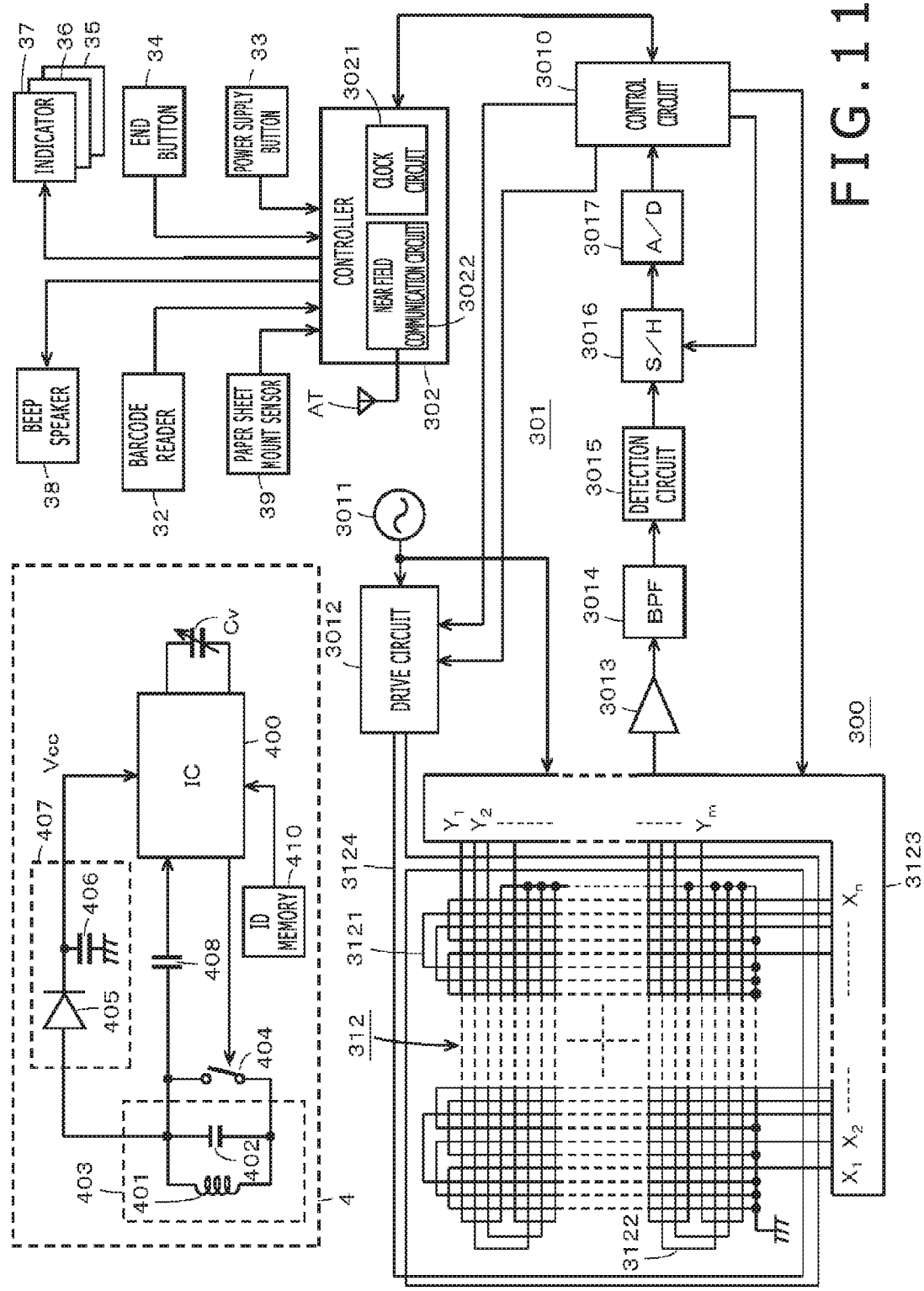
FIG. 11 is a block diagram depicting an example of an electric circuit configuration of the tablet terminal and an electronic pen which configure the hand-written information inputting apparatus depicted in FIG. 1, according to one or more embodiments of the present disclosure.

FIG. 11 is a view depicting an equivalent circuit of the electronic pen 4 in the present embodiment and an example of a circuit configuration of the electronic pen 4 and the position detection device 300 of the tablet terminal 3 which performs position detection and writing pressure detection in accordance with the electromagnetic induction system.

The position detection device 300 of the tablet terminal 3 of the example of FIG. 11 includes the sensor 312, coordinate data generation circuit 301 and controller 302 as described hereinabove. In the sensor 312, an X-axis direction loop coil group 3121 and a Y-axis direction loop coil group 3122 are formed in a layered relationship with each other and a selection circuit 3123 which successively selects loop coils of one of the two loop coil groups 3121 and 3122.

The electronic pen 4 includes a signal controlling circuit configured from an IC (Integrated Circuit) 400 and is configured such that it acquires a driving voltage for driving the IC 400 from an excitation signal transmitted thereto from an excitation coil 3124 provided in the sensor 312 of the position detection device 300 of the tablet terminal 3. It is to be noted that, although, in FIG. 11, as an example, the loop coil groups 3121 and 3122 of the sensor 312 are used only for reception of an electromagnetic coupling signal from the electronic pen 4, also it is possible for the loop coil groups 3121 and 3122 of the tablet terminal 3 to establish electromagnetic coupling to the electronic pen 4 to drive the signal controlling circuit provided in the electronic pen 4 in place of the excitation coil 3124. Further, a signal of predetermined control data or the like is transmitted to the signal controlling circuit provided in the electronic pen 4.

In the sensor 312 of the position detection device 300 of the example of FIG. 11, the excitation coil 3124 is disposed in such a manner as to surround the X-axis direction loop coil group 3121 and the Y-axis direction loop coil group 3122. Although, in FIG. 11, the excitation coil 3124 has two turns, it actually has a greater number of turns such as, for example, 8 to 10 turns. As depicted in FIG. 11, the excitation coil 3124 is coupled to a drive circuit 3012, which in turn is coupled to an oscillation circuit 3011 which oscillates in a frequency fo. The oscillation signal from the oscillation circuit 3011 is supplied to the selection circuit 3123.

The drive circuit 3012 is controlled by a process controlling circuit 3010 configured from a microcomputer. The process controlling circuit 3010 controls the drive circuit 3012 to control supply of an oscillation signal of the frequency fo from the oscillation circuit 3011 to the excitation coil 3124 thereby to control signal transmission from the excitation coil 3124 to the electronic pen 4.

The selection circuit 3123 is selectively controlled by the process controlling circuit 3010 to select one loop coil. An induced voltage generated in the loop coil selected by the selection circuit 3123 is amplified by a reception amplifier 3013 and supplied to a band-pass filter 3014, by which only a component of the frequency fo is extracted. The band-pass filter 3014 supplies the extracted component to a detection circuit 3015.

The detection circuit 3015 detects a component of the frequency fo and supplies a DC (Direct Current) signal corresponding to the detected component of the frequency fo to a sample and hold circuit 3016. The sample and hold circuit 3016 holds an output signal of the detection circuit 3015 at a predetermined timing, particularly at a predetermined timing within a reception period, and sends out the held output signal of the detection circuit 3015 to an A/D (Analog to Digital) conversion circuit 3017. The A/D conversion circuit 3017 converts an analog output of the sample and hold circuit 3016 into a digital signal and outputs the digital signal to the process controlling circuit 3010. The process controlling circuit 3010 supplies the signal at the predetermined timing to the sample and hold circuit 3016.

Then, the process controlling circuit 3010 decides whether or not the digital signal from the A/D conversion circuit 3017 has a value exceeding a predetermined threshold value to decide whether or not the loop coil selected by the selection circuit 3123 is a loop coil at a position indicated by the electronic pen 4. Then, the process controlling circuit 3010 detects the indicated position by the electronic pen 4 on the basis of the decision.

Further, the process controlling circuit 3010 detects on/off of a signal from the electronic pen 4 as a digital signal of several bits to detect a writing pressure and detects a pen ID separately from detection of an indicated position by the electronic pen 4 as hereinafter described. Then, the process controlling circuit 3010 supplies information of the detected indicated position by the electronic pen 4, information of the detected writing pressure and the detected pen ID in an associated relationship with each other to the controller 302.

The controller 302 includes a clock circuit 3021 with a calendar function and adds time information from the clock circuit 3021 as a timestamp to the information of the indicated position by the electronic pen 4, information of the writing pressure and pen ID received from the process controlling circuit 3010. Then, the controller 302 transmits the information of the indicated position by the electronic pen 4, information of the writing pressure and pen ID, to which the timestamp is added, from a near field communication circuit 3022 to the mobile terminal 5 by wireless transmission.

It is to be noted that, although the near field communication circuit 3022 of the controller 302 uses wireless communication of the Bluetooth (registered trademark) standard as described hereinabove, it also performs a function that decides whether or not wireless communication with the mobile terminal 5 is possible. The controller 302 controls the communication indicator 36 in response to a result of the decision of whether or not wireless communication is possible.

Further, the controller 302 performs such communication as hereinafter described with the mobile terminal 5 to control the preparation completion indicator 37. Further, the controller 302 sends out barcode information read by the barcode reader 32 from the near field communication circuit 3022 to the mobile terminal 5. Further, if it is detected from a sensor output of the paper sheet mount sensor 39 that a paper sheet is placed on the receiving surface 3S and locked by the clip member 31, then the controller 302 controls the barcode reader 32 so as to be activated. Further, as described hereinabove, the controller 302 controls sound emission of a beep sound from the beep speaker 38 on the basis of such communication as hereinafter described with the mobile terminal 5. Thus, the controller 302 performs such various controlling operations as hereinafter described.

The electronic pen 4 has such a circuit configuration as indicated by a surrounding broken line in FIG. 11. In particular, a capacitor 402 is connected in parallel with a coil 401 as an inductance element to configure a resonance circuit 403. A switch 404 is connected in parallel with the resonance circuit 403. The switch 404 is configured such that it is controlled on and off by the IC 400. When the switch 404 is off, resonance operation with a signal from the sensor 312 is performed by the resonance circuit 403. However, when the switch 404 is on, the capacitor 402 connected in parallel with the coil 401 is short-circuited thereby to turn off the resonance operation of the resonance circuit 403 with a signal from the sensor 312.

The IC 400 is configured such that it operates with a power supply voltage Vcc obtained by rectifying an AC signal received through electromagnetic induction from the sensor 312 of the position detection device 300 of the tablet terminal 3 by the resonance circuit 403 using a rectification circuit (power supply circuit) 407 configured from a diode 405 and a capacitor 406. The IC 400 is connected to the resonance circuit 403 through a capacitor 408 and normally monitors an operation situation of the resonance circuit 403. By monitoring the operation situation of the resonance circuit 403, the IC 400 can perform desired operation control based on the situation of electromagnetic coupling to the excitation coil 3124 of the sensor 312, or, although description is omitted in regard to the present example, based on signal detection of control data transmitted from the sensor 312 of the position detection device 300 using the two loop coil groups 3121 and 3122.

The electronic pen 4 in the present embodiment includes a writing pressure detection circuit configured from a pressure sensor which detects a writing pressure applied to the core body 4S, for example, as a capacitance Cv of a variable capacitor. As depicted in FIG. 11, this variable capacitor is connected to the IC 400 such that the IC 400 can detect the capacitance Cv according to the writing pressure. The IC 400 detects a writing pressure of the electronic pen 4 from the value of the capacitance Cv. Then, the IC 400 converts the detected writing pressure into a digital signal, for example, of 8 bits and controls the switch 404 with a digital signal corresponding to the writing pressure to transmit information of the writing pressure as additional information to the position detection device 300 of the tablet terminal 3.

Further, in the electronic pen 4 in the present embodiment, an ID memory 410 that stores a pen ID is connected to the IC 400 as depicted in FIG. 11. The IC 400 controls the switch 404 also with a pen ID read out from the ID memory 410 to transmit the pen ID as additional information to the position detection device 300 of the tablet terminal 3.

Position detection operation of the electronic pen 4 and the position detection device 300 of the tablet terminal 3 configured in such a manner as described above and detection operation of writing pressure information or a pen ID are described below.

The process controlling circuit 3010 first drives the drive circuit 3012 to transmit a signal from the excitation coil 3124 to the electronic pen 4 for a predetermined period of time. Then, the process controlling circuit 3010 controls the selection circuit 3123 to successively select one loop coil of the X-axis direction loop coil group 3121 and send a burst signal to the electronic pen 4. The electronic pen 4 receives the burst signal by the resonance circuit 403 and sends back the received burst signal to the sensor 312 of the position detection device 300 of the tablet terminal 3. The process controlling circuit 3010 detects the sent back burst signal as a position detecting signal to determine an X coordinate value of a position indicated by the electronic pen 4.

Then, the process controlling circuit 3010 drives the drive circuit 3012 to transmit a signal from the excitation coil 3124 to the electronic pen 4 for a predetermined period of time. Then, the process controlling circuit 3010 controls the selection circuit 3123 to successively select one loop coil of the Y-axis direction loop coil group 3122 and send a burst signal to the electronic pen 4. The electronic pen 4 receives the burst signal by the resonance circuit 403 and sends back the received burst signal to the sensor 312 of the position detection device 300 of the tablet terminal 3. The process controlling circuit 3010 detects the sent back burst signal as a position detecting signal to determine a Y coordinate value of the position indicated by the electronic pen 4.

After the indicated position by the electronic pen 4 is detected in such a manner as described above, in order to allow detection of writing pressure information and pen ID information as additional information from the electronic pen 4, the process controlling circuit 3010 first performs transmission of a signal from the excitation coil 3124 continuously for a predetermined period of time or longer and then performs transmission and reception of a signal at a timing similar to that upon coordinate detection continuously by a number of times according to a number of bits of the digital signal of the additional information. At this time, the selection circuit 3123 selects a loop coil (any of an X-axis direction loop coil and a Y-axis direction loop coil) nearest to the electronic pen 4 in accordance with the detected coordinate values to receive a signal.

On the other hand, the IC 400 of the electronic pen 4 uses a digital signal of additional information including writing pressure information and pen ID information obtained corresponding to the capacitance Cv of the variable capacitor configuring writing pressure detector to on-off control the switch 404 in synchronism with transmission or reception of a signal from the position detection device 300 of the tablet terminal 3. When the switch 404 is off, since the resonance circuit 403 can send back a signal transmitted from the position detection device 300 to the position detection device 300, the loop coil of the position detection device 300 receives this signal. In contrast, when the switch 404 is on, the resonance circuit 403 is in a state in which a resonance operation thereof is inhibited, and therefore, the signal is not sent back from the resonance circuit 403 to the position detection device 300, and the loop coil of the position detection device 300 does not receive a signal.

Since the process controlling circuit 3010 of the coordinate data generation circuit 301 of the position detection device 300 determines the presence or absence of a reception signal by a number of times corresponding to a number of bits of the digital signal of additional information, it can receive a digital signal of a plurality of bits according to writing pressure information and a pen ID and detect the writing pressure information and the pen ID information from the electronic pen 4. Accordingly, the electronic pen 4 transmits the writing pressure information and the pen ID information as an ASK (Amplitude Shift Keying) modulated signal to the position detection device 300 of the tablet terminal 3.

[Example of Processing Operation of Tablet Terminal 3]

An example of processing operations of the tablet terminal 3 in the present embodiment is described with reference to flow charts of FIGS. 12 to 14. It is to be noted that processes described below are performed principally by the controller 302.

If power supply is made available to the tablet terminal 3 through the power supply button 33, then the controller 302 places the power indicator 35 into a lit state (S201). Then, the controller 302 checks the communication state of the near field communication circuit 3022 to decide whether or not communication with the mobile terminal 5 is possible (S202). If communication with the mobile terminal 5 is not possible, then the controller 302 controls the communication indicator 36 to flicker to notify the user that communication is not possible (S203). Then, the controller 302 returns its processing to S202, at which it waits until communication with the mobile terminal 5 becomes possible.

Then, if it is confirmed at S202 that communication with the mobile terminal 5 has become possible, then the controller 302 changes the communication indicator 36 from the flickering state to a lit state to notify the user that communication with the mobile terminal 5 is possible (S204).

Then, the controller 302 decides from a sensor output of the paper sheet mount sensor 39 whether or not a hand-written information inputting paper sheet 8 is placed on and locked to the receiving surface 3S by the clip member 31 (S205). If it is decided at S205 that a hand-written information inputting paper sheet 8 is not placed on the receiving surface 3S, then the controller 302 decides whether or not a position indication input by the electronic pen 4 is detected (S206).

If it is decided at S206 that a position indication input by the electronic pen 4 is not detected, then the controller 302 returns its processing to S205 and repeats the processing operations beginning at S205. On the other hand, if a position indication input by the electronic pen 4 is detected at S206, then since a hand-written information inputting paper sheet 8 is not placed, the controller 302 controls the beep speaker 38 to emit a beep sound to issue an alarm notification to the user (S207). Then, the controller 302 returns its processing to S205 and repeats the processing operations beginning at S205.

If it is decided at S205 that a hand-written information inputting paper sheet 8 is placed on the receiving surface 3S, then the controller 302 places the preparation completion indicator 37 into a flickering state (S208). Then, the controller 302 controls the barcode reader 32 to read a barcode associated with the paper ID (S209).

Figure 13:
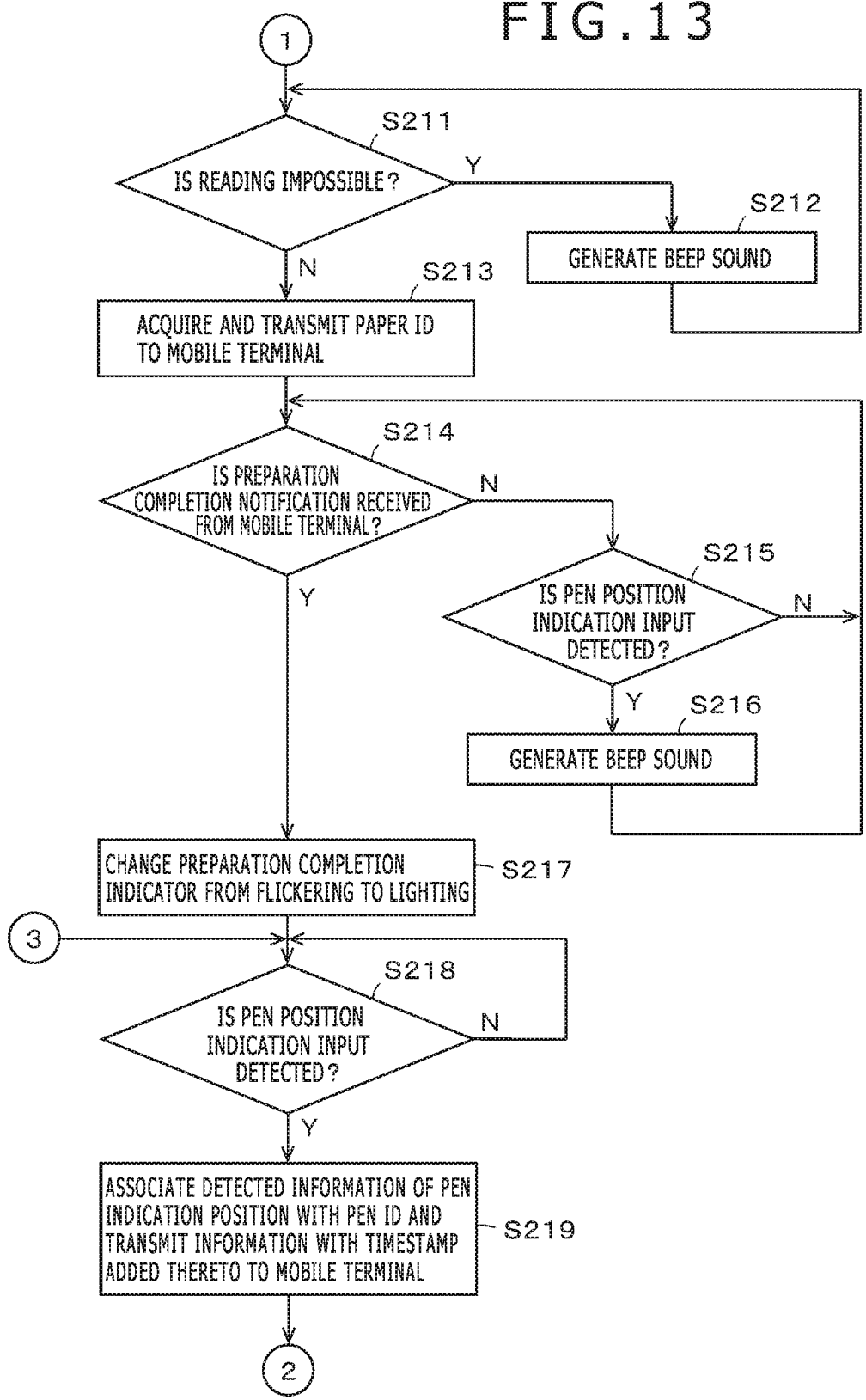
FIG. 13 is part of the flow chart illustrating the example of processing operations of the tablet terminal depicted in FIG. 9, according to one or more embodiments of the present disclosure.

Then, the controller 302 decides whether or not reading of a barcode is impossible (S211 of FIG. 13). If it is decided that reading is impossible, then the controller 302 controls the beep speaker 38 to generate a beep sound to issue an alarm notification (S212), whereafter the processing is returned to S211. In response to the alarm notification by a beep sound, the user would perform such a countermeasure for making it possible to read a barcode as to re-mount the hand-written information inputting paper sheet 8 correctly.

Then, if it is decided at S211 that reading of a barcode is possible, then the controller 302 acquires the barcode information (paper ID) read by the barcode reader 32 and transmits the barcode information to the mobile terminal 5 (S213).

If the mobile terminal 5 receives the barcode information (paper ID), then it sends a hand-written information inputting starting request including the barcode information (paper ID) to the server apparatus 1 as hereinafter described. Then, the mobile terminal 5 decides whether or not paper format display information for displaying a paper format corresponding to the barcode information (paper ID) is received as a rely to the hand-written information inputting starting request from the server apparatus 1, or in other words, whether or not paper format display information can be displayed on the display screen. If, as a result of the decision, a paper format corresponding to the barcode information (paper ID) can be displayed on the display screen, then the mobile terminal 5 notifies the tablet terminal 3 that preparations for inputting hand-written information are completed by changing the preparation completion indicator 37 from a flickering state to a lit state.

Therefore, the controller 302 decides whether or not a preparation completion notification is received from the mobile terminal 5 (S214). If it is decided that a preparation completion notification is not received, then the controller 302 decides whether or not a position indication input by the electronic pen 4 is detected (S215).

If it is decided at S215 that a position indication input by the electronic pen 4 is not detected, then the controller 302 returns its processing to S214 and repeats the processing operations beginning at S214. On the other hand, if it is decided at S215 that a position indication input by the electronic pen 4 is detected, then since the mobile terminal 5 is not in a state in which input preparations for hand-written information are not completed, a beep sound is emitted from the beep speaker 38 to issue an alarm notification (S216). Then, the controller 302 returns its processing to S214 and repeats the processing operations beginning at S214.

If it is decided at S214 that a preparation completion notification is received from the mobile terminal 5, then the controller 302 changes the preparation completion indicator 37 in a flicking state to a lit state to notify the user that hand-written information inputting has become possible (S217).

Then, the controller 302 waits for detection of a hand-written information inputting by the electronic pen 4 (S218). If it is decided that a hand-written information inputting by the electronic pen 4 is detected, then the controller 302 associates information of the detected indicated position by the electronic pen 4 with the detected pen ID and adds time information acquired from the clock circuit 3021 as a timestamp to the information and then transmits the information to the mobile terminal 5 (S219). In this case, since the barcode information (paper ID) read by the barcode reader 32 has already been transmitted to the mobile terminal 5, this may not be transmitted at S219. However, for the confirmation, also the barcode information (paper ID) may be transmitted in an associated relationship with the transmission information to the mobile terminal 5.

Figure 14:
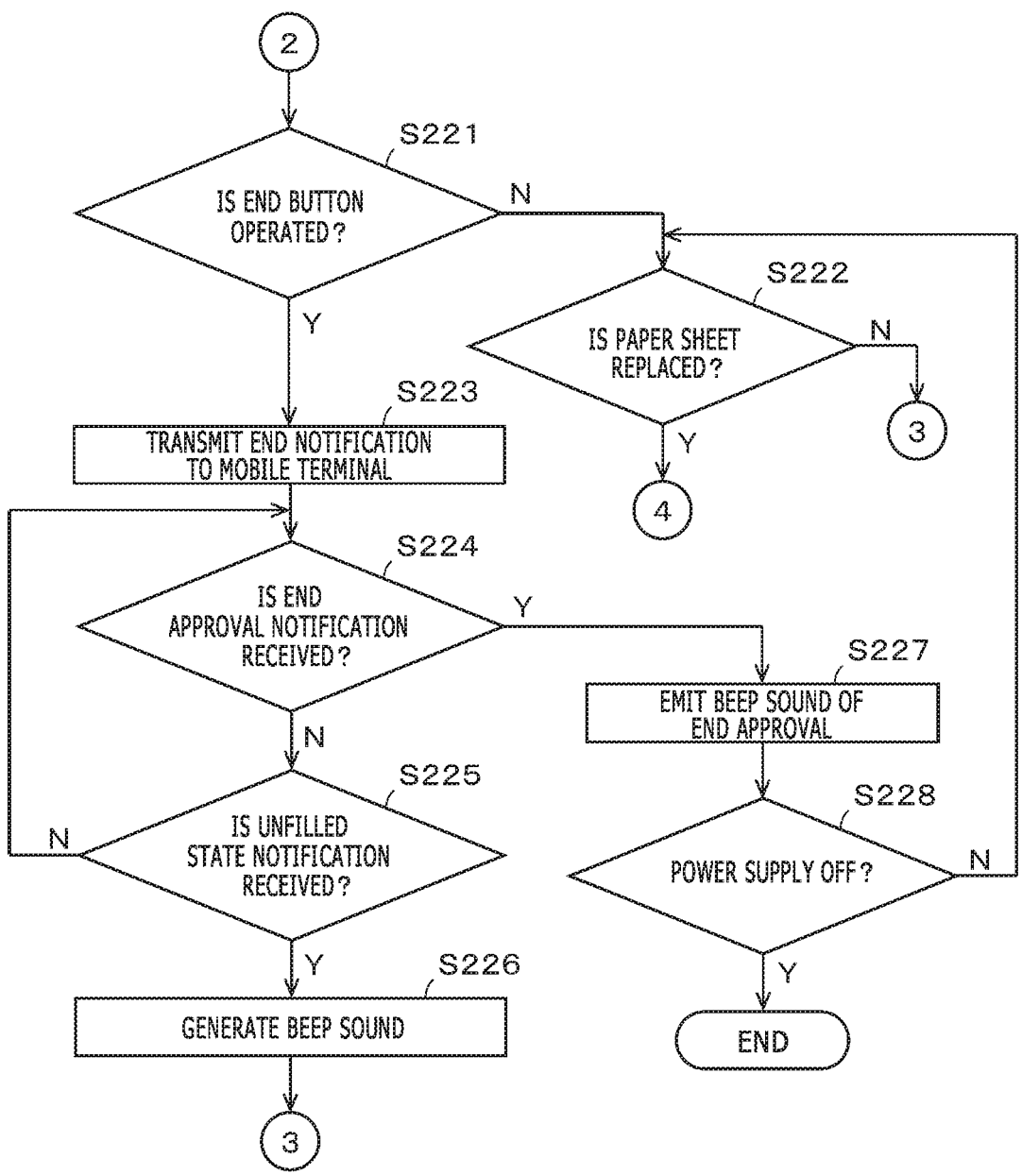
FIG. 14 is part of the flow chart illustrating the example of processing operations of the tablet terminal depicted in FIG. 9, according to one or more embodiments of the present disclosure.

Then, the controller 302 decides whether or not the end button 34 is operated (S221 of FIG. 14). If it is decided at S221 that the end button 34 is not operated, then the controller 302 decides on the basis of a detection output of the paper sheet mount sensor 39 whether or not the hand-written information inputting paper sheet 8 is replaced (S222). In particular, if a paper sheet placed on the receiving surface 3S is unlocked by the clip member 31 and removed for replacement, then since it becomes possible to receive light of the light emitting circuit by the light receiving circuit of the paper sheet mount sensor 39, the paper sheet mount sensor 39 is turned on once. Thereafter, if a paper sheet is placed on the receiving surface 3S and locked by the clip member 31, then the paper sheet mount sensor 39 cannot receive light of the light emitting circuit any more by the light receiving circuit and is turned off, and consequently, the replacement of the paper sheet is detected.

If it is decided at S222 that the paper sheet is not replaced, then the controller 302 advances the processing to S218 of FIG. 13 and repeats the processing operations for hand-written information inputting by the electronic pen 4 to the same hand-written information inputting paper sheet 8 beginning at S218.

Figure 12:
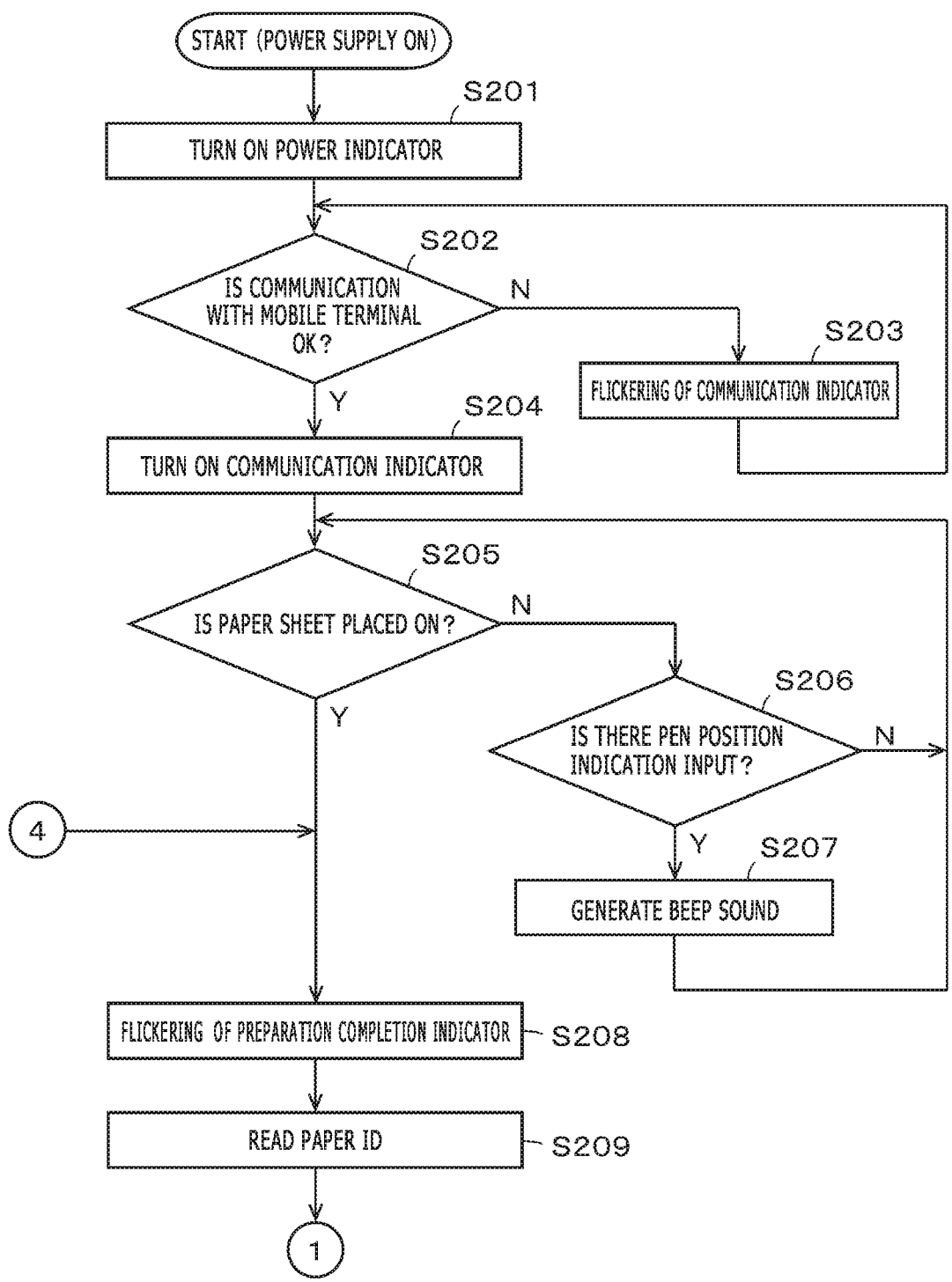
FIG. 12 is part of a flow chart illustrating an example of processing operations of the tablet terminal depicted in FIG. 9, according to one or more embodiments of the present disclosure.

On the other hand, if it is decided at S222 that the paper sheet is replaced, then the controller 302 advances the processing to S208 of FIG. 12 and repeats the processing operations when a hand-written information inputting paper sheet 8 is placed on the receiving surface 3S beginning at S208.

Then, if it is decided at S221 that the end button 34 is operated, then the controller 302 decides that the hand-written information inputting to the hand-written information inputting paper sheet 8 placed on the receiving surface 3S ends, and transmits an end notification to the mobile terminal 5 (S223).

As described hereinbelow, when the mobile terminal 5 receives the end notification, the mobile terminal 5 decides on the basis of information of a paper form corresponding to the hand-written information inputting paper sheet 8 placed on the receiving surface 3S whether or not an unfilled inputting region remains on the hand-written information inputting paper sheet 8. If no unfilled inputting region remains, then the mobile terminal 5 transmits an end approval notification to the tablet terminal 3. If an unfilled inputting region remains, then the mobile terminal 5 transmits an unfilled state notification.

Therefore, the controller 302 decides whether or not an end approval notification is received from the mobile terminal 5 (S224). If it is decided that an end approval notification is not received, then the controller 302 decides whether or not an unfilled state notification is received (S225). If it is decided at S225 that an unfilled state notification is not received, then the controller 302 returns the processing to S224 waits for an end approval notification. On the other hand, if it is decided at S225 that an unfilled state notification is received, then the controller 302 controls the beep speaker 38 to emit a beep sound to issue an alarm notification (S226). Then, the controller 302 returns the processing to S218 of FIG. 13 and waits for completion of the hand-written inputting by the electronic pen 4 to an unfilled inputting region.

Then, if it is decided at S224 that an end approval notification is received from the mobile terminal 5, then the controller 302 controls the beep speaker 38 to emit a beep sound indicative of an end approval (S227). Here, the beep sound for an end approval is different from the beep sound for the other alarm notification, and where the beep sound for alarm notification is, for example, prolonged sound like "pee," the beep sound for an end approval is successive emissions of short sound like "pi!, pi!." Consequently, the notifications can be issued as beep sounds which can be identified from each other.

Subsequently to S227, the controller 302 decides whether or not the power supply button 33 is operated to turn off the power supply (S228), and if it is decided that the power supply is not off, then the controller 302 returns its processing to S222 and repeats the processing operations beginning at S222. On the other hand, if it is decided at S228 that the power supply is off, then the controller 302 ends all processing routines and then turns off the power supply.

It is to be noted that the user can depress the end button 34 not only for every one hand-written information inputting paper sheet 8 but also after completion of hand-written information inputting to the hand-written information inputting paper sheet 8, for example, over a plurality of pages. In this case, the mobile terminal 5 handles a plurality of pages of hand-written information inputting paper sheets 8 before an end notification based on an operation of the end button 34 is received as one paper sheet group as hereinafter described.

<Example of Configuration of Mobile Terminal 5>

Figure 15:
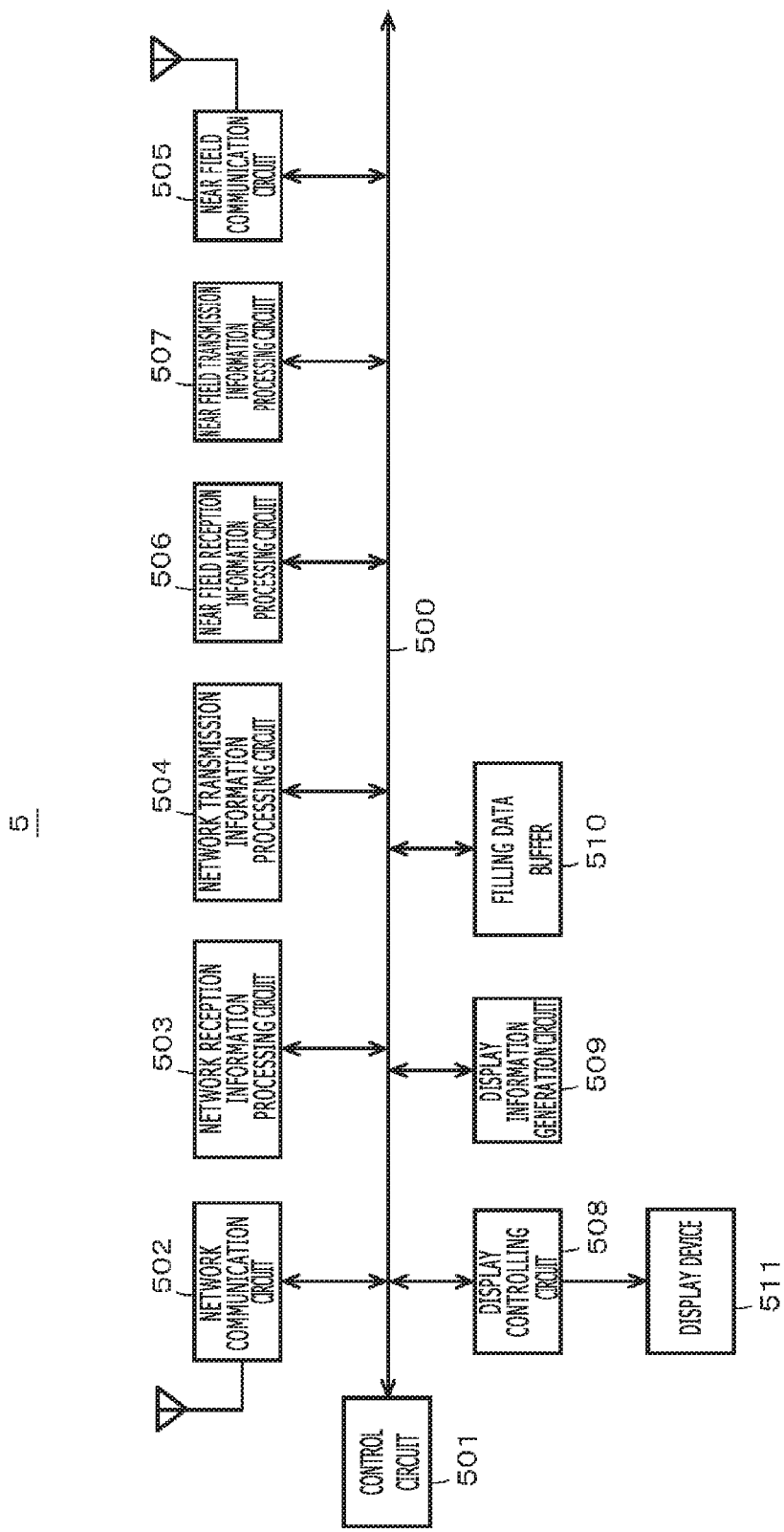
FIG. 15 is a block diagram depicting an example of a configuration of a mobile terminal which configures the hand-written information inputting apparatus depicted in FIG. 1, according to one or more embodiments of the present disclosure.

FIG. 15 is a block diagram depicting an example of a hardware configuration of the mobile terminal 5 in the present embodiment. The mobile terminal 5 of the present example is configured such that, as depicted in FIG. 15, a network communication circuit 502, a network reception information processing circuit 503, a network transmission information processing circuit 504, a near field communication circuit 505, a near field reception information processing circuit 506, a near field transmission information processing circuit 507, a display control circuit 508, a display information generation circuit 509 and a filling data buffer 510 are connected through a system bus 500 to a control circuit 501 configured from a computer. To the display control circuit 508, a display device 511 formed from, for example, an LCD (Liquid Crystal Display) device is connected.

The network communication device 502, in operation, connects to the server apparatus 1 through the communication network 6. The network reception information processing circuit 503, in operation, processes information from the server apparatus 1 received by the network communication circuit 502. The network transmission information processing circuit 504, in operation, generates information to be transmitted to the server apparatus 1 through the network communication circuit 502.

The near field communication circuit 505, in operation, connects to the tablet terminal 3 by wireless connection. As described hereinabove, in the present example, the near field communication circuit 505, in operation, communicates according to the Bluetooth (registered trademark) standard. The near field reception information processing circuit 506, in operation, processes information received from the tablet terminal 3. The near field transmission information processing circuit 507, in operation, generates information to be transmitted to the tablet terminal 3.

The display control circuit 508 performs display control of an image to be displayed on the display screen of the display device 511. The display information generation circuit 509 generates display information based on information from the server apparatus 1 received through the network reception information processing circuit 503 or information from the tablet terminal 3 received through the near field reception information processing circuit 506.

The filling data buffer 510 is provided in a memory device and stores hand-written information received from the tablet terminal 3 through the near field reception information processing circuit 506 in an associated relationship with a paper ID or a pen ID until an ending instruction is received from the tablet terminal 3.

It is to be noted that, in FIG. 15, the network reception information processing circuit 503, network transmission information processing circuit 504, near field reception information processing circuit 506, near field transmission information processing circuit 507, display control circuit 508 and display information generation circuit 509 can be configured by the control circuit 501 (e.g., a microprocessor) executing instructions in accordance with a software program.

[Example of Processing Operation of Mobile Terminal 5]

Figure 16:
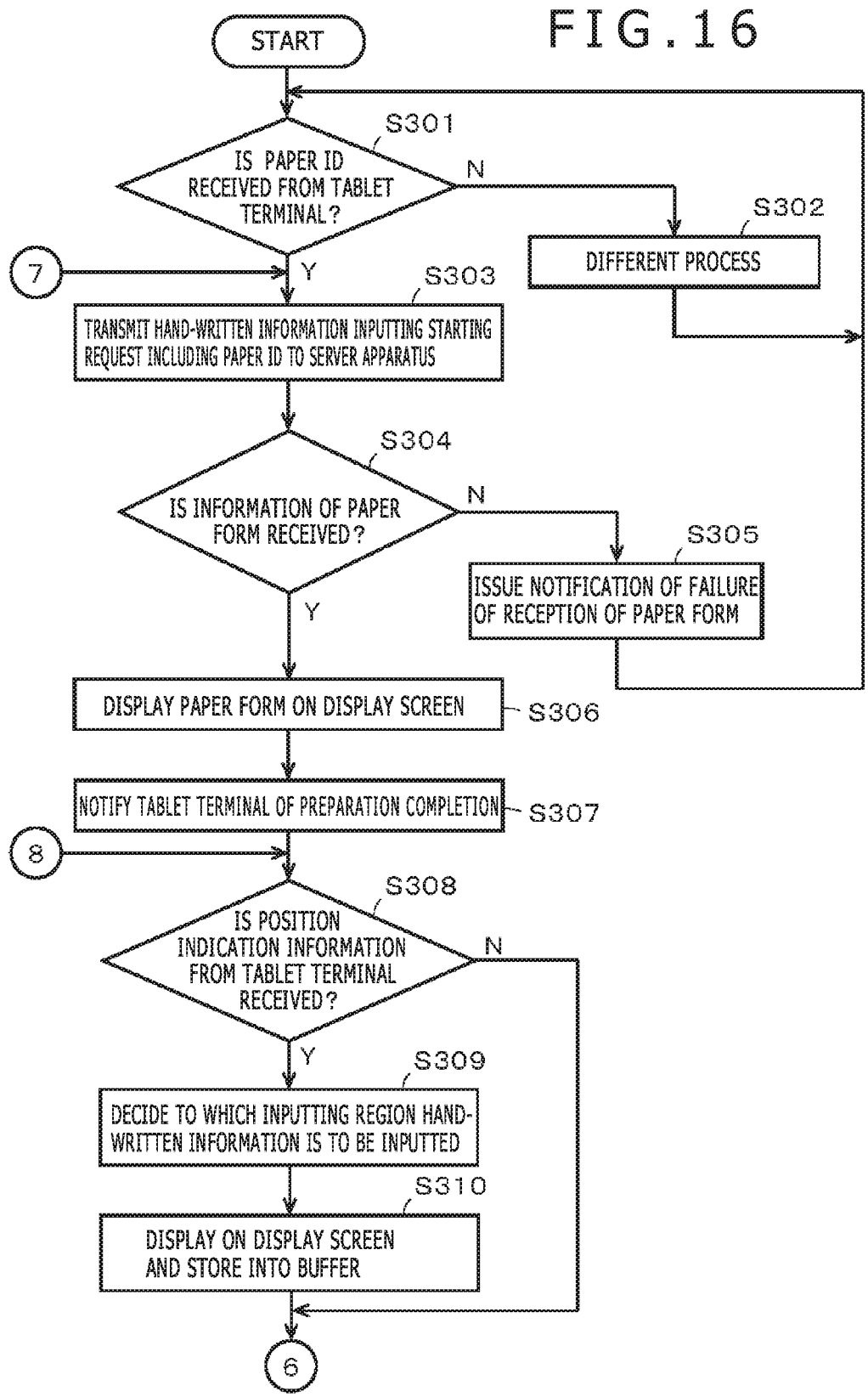
FIG. 16 is part of a flow chart illustrating an example of processing operations of the mobile terminal depicted in FIG. 15, according to one or more embodiments of the present disclosure.
Figure 17:
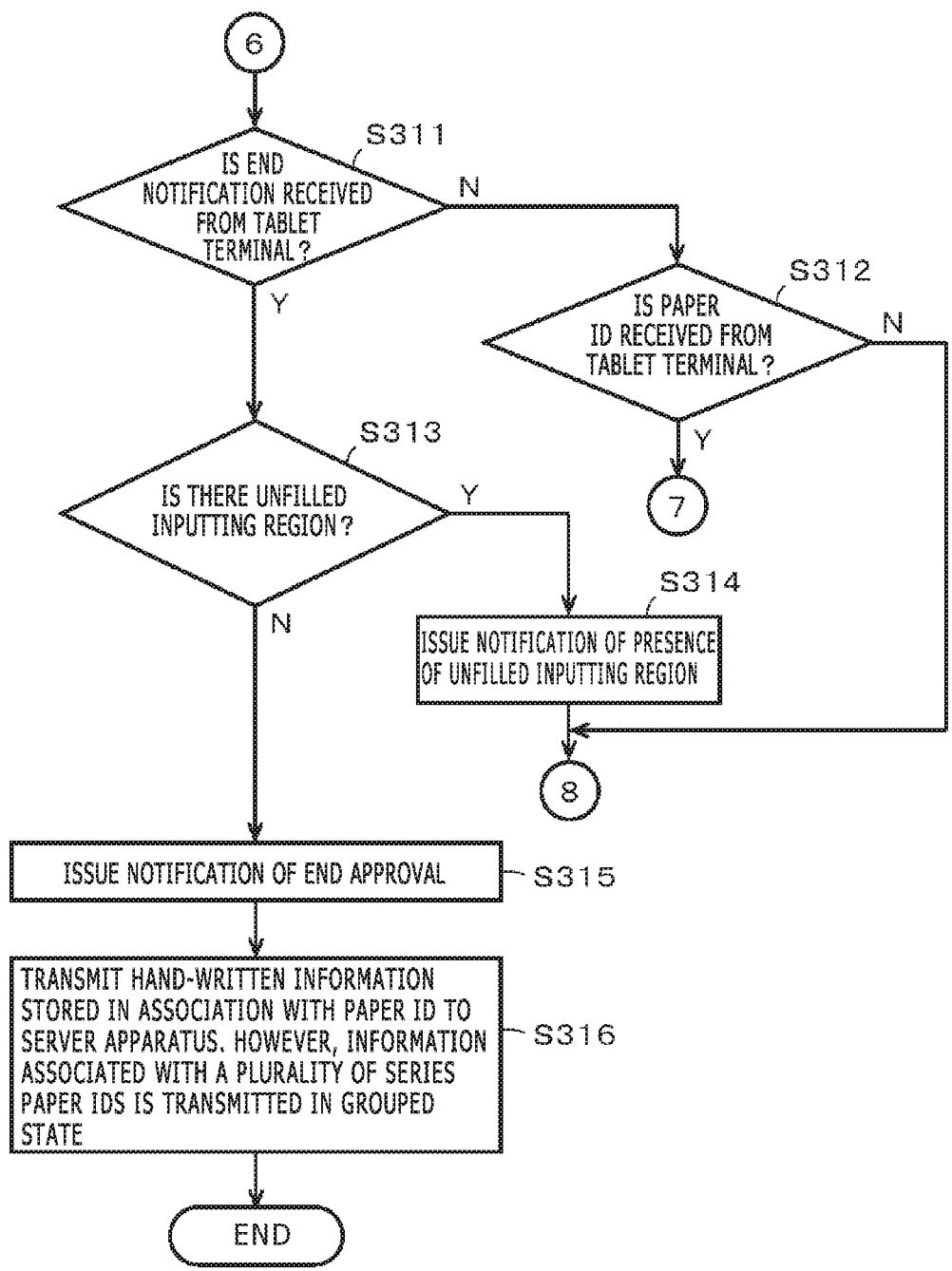
FIG. 17 is part of the flow chart illustrating the example of processing operations of the mobile terminal depicted in FIG. 15, according to one or more embodiments of the present disclosure.

Now, an example of processing operation of the mobile terminal 5 in the present embodiment is described with reference to flowcharts of FIGS. 16 and 17. It is to be noted that the processing operation of the mobile terminal 5 described below is described as processing operation where the network reception information processing circuit 503, network transmission information processing circuit 504, near field reception information processing circuit 506, near field transmission information processing circuit 507, display control circuit 508 and display information generation circuit 509 are configured by the control circuit 501 executing instructions in accordance with a software program.

The control circuit 501 of the mobile terminal 5 decides whether or not barcode information as a paper ID from the tablet terminal 3 is received (S301). If it is decided at S301 that barcode information is not received from the tablet terminal 3, then the control circuit 501 performs some other process (S302) and returns, after the process ends, the processing to S301.

If it is decided at S301 that barcode information is received from the tablet terminal 3, then the control circuit 501 transmits a hand-written information inputting starting request including the received barcode information as a paper ID to the server apparatus 1 (S303).

The server apparatus 1 having received the hand-written information inputting starting request transmits, if a paper form corresponding to the barcode information as a paper ID included in the hand-written information inputting starting request is registered as described hereinabove, the information of the paper form to the mobile terminal 5. However, if the corresponding paper form is not registered, then the server apparatus 1 transmits a request NG as information indicating that the information of the paper form cannot be transmitted to the mobile terminal 5 to the mobile terminal 5.

The control circuit 501 of the mobile terminal 5 decides whether or not the information of the paper form is received successfully (S304), and if the mobile terminal 5 does not receive the information of the paper form but receives a request NG, then control circuit 501 notifies the tablet terminal 3 that reception of the paper form results in failure (S305).

Then, if it is decided at S304 that information of the paper form is received, then the control circuit 501 uses display data of the paper form in the received information of the paper form to display a paper form corresponding to the paper ID on the display screen of the display device 511 (S306). Then, if the paper form corresponding to the paper ID is displayed on the display device 511, then the control circuit 501 transmits a preparation completion notification to the tablet terminal 3 through the near field communication circuit 505 (S307).

Thereafter, the control circuit 501 decides whether or not position indication information as hand-written information by the electronic pen 4 from the tablet terminal 3 is received through the near field communication circuit 505 (S308).

Then, if it is decided at S308 that position indication information by the electronic pen 4 from the tablet terminal 3 is received, then the control circuit 501 refers to region coordinate data of inputting regions of the paper form included in the information of the paper form received from the server apparatus 1 to decide to which one of the inputting regions the coordinate data of the received position indication information by the electronic pen 4 as hand-written information is to be inputted (S309).

Then, the control circuit 501 controls the display device 511 to display the received hand-written information in the corresponding inputting region of the paper form displayed on the display screen of the display device 511 and stores the received hand-written information in an associated relationship with corresponding attribute information of the inputting region into the filling data buffer 510 (S310).

Subsequently to S310, the control circuit 501 decides whether or not an end notification is received from the tablet terminal 3 (S311 of FIG. 17). Also when position indication information by the electronic pen 4 is not received from the tablet terminal 3 at S308, the control circuit 501 advances the processing to S311, at which it decides whether or not an end notification is received from the tablet terminal 3.

Then, if it is decided at S311 that an end notification is not received from the tablet terminal 3, then the control circuit 501 decides whether or not a paper ID is received from the tablet terminal 3 (S312). If it is decided at S312 that a paper ID is not received from the tablet terminal 3, then the control circuit 501 returns its processing to S308 of FIG. 16 and repeats the processing operations beginning at S308. On the other hand, if it is decided at S312 that a paper ID is received from the tablet terminal 3, then the control circuit 501 returns its processing to S303 of FIG. 16 and repeats the processing operations beginning at S303.

If it is decided at S311 that an end notification is received from the tablet terminal 3, then the control circuit 501 refers to the storage information of the filling data buffer 510 to confirm whether or not all hand-written information necessary for the inputting regions of the paper form corresponding to the paper ID received from the tablet terminal 3 is acquired thereby to decide whether or not there remains an unfilled inputting region whose filling is essentially required (S313). If, at S313, a plurality of paper IDs are received before an end notification is received from the tablet terminal 3, then whether or not there remains an unfilled inputting region is decided for all of a plurality of paper forms corresponding to the plurality of paper IDs.

If it is decided at S313 that there remains an unfilled inputting region whose filling is essentially required, then the control circuit 501 transmits a notification to the tablet terminal 3 that there remains an unfilled inputting region (S314). When the tablet terminal 3 receives this notification, since an alarm notification is issued as a beep sound, the user can find out an unfilled inputting region and input hand-written information by the electronic pen 4. The control circuit 501 of the mobile terminal 5 advances the processing from S314 to S308 of FIG. 16 and repeats the processing operations beginning at S308 such that hand-written information can be inputted.

If it is decided at S313 that there remains no unfilled inputting region, then the control circuit 501 transmits a notification of an end approval to the tablet terminal 3 (S315). Then, the control circuit 501 transmits the hand-written information stored in the filling data buffer 510 in an associated relationship with the paper ID to the server apparatus 1 (S316). At this time, if information filled in an associated relationship with the plurality of paper IDs is included in the filling data buffer 510, then the control circuit 501 decides that the information is pieces of information of successive pages and classifies the pieces of information into a group, and transmits the information group, for example, with a group ID or the like added thereto. Thereafter, the control circuit 501 ends the processing routine.

[Effects of Embodiment]

As described above, in the hand-written information inputting apparatus of the embodiment described above, when it is confirmed that electronic data of a paper form printed on a hand-written information inputting paper sheet 8 locked by the clip member 31 exists in the tablet terminal 3 and can be displayed on the display screen of the mobile terminal 5, hand-written information inputting by the electronic pen 4 to the hand-written information inputting paper sheet 8 locked by the clip member 31 is enabled. Therefore, when hand-written information inputting by the electronic pen 4 to the hand-written information inputting paper sheet 8 is performed, it is secured that corresponding electronic data is obtained. Accordingly, such a situation that, although hand-written inputting to a paper sheet is performed, corresponding electronic data is not obtained as in the case of a prior art does not occur.

Then, with the embodiment described above, since only it is necessary for the hand-written information inputting paper sheet 8 to have printed thereon information which corresponds to a paper ID such as, for example, a barcode, there is no necessity to use a paper sheet for exclusive use or the like in which an Anoto pattern (dot pattern) is used. Further, since there is no necessity to use a special digital pen as the electronic pen, there is an effect that the electronic pen can be configured at a low cost.

[Modifications to Embodiment]

<Modification to Mobile Terminal 5>

The mobile terminal 5 configuring the hand-written information inputting apparatus of the embodiment described above does not include a character recognition engine or an image recognition engine that recognizes, by character recognition or image recognition, hand-written information which is position indication information by the electronic pen 4 from the tablet terminal 3. However, if the mobile terminal 5 incorporates such an engine as described above, then it can perform such a character recognition process or an image recognition process as described below.

In particular, in information of a paper form, inputting regions for inputting to individual items, position information indicative of positions of the inputting regions and attributes of the inputting regions or attributes of information to be inputted to the inputting regions, namely, such attributes as whether or not information inputting to each inputting region is essentially required, dependency on a different inputting region for inputting depending upon an inputting region to which information is inputted, or whether or not information to be inputted to each inputting region is a text, a numeral, a Boolean (true or false) or a signature or what language is to be used for inputting, are defined in an associated relationship with the individual inputting regions configuring the input form, and can be registered into the paper form database 111 of the server apparatus 1 such that they can be referred to.

When hand-written information is to be inputted to a paper sheet, if an inputting person writes a mistake, then the inputting person frequently performs a writing gesture for indicating the written mistake such as to overwrite a double line at the written mistake portion by an electronic pen or input a cross mark surrounded by a quadrangle and inputs alternative characters for the characters that are mistakes in the proximity of the inputting region. Characters or the like inputted alternatively in this case are frequently written to a portion outside the inputting region of the hand-written information inputting paper sheet 8.

In the example described below, the mobile terminal 5, in operation, recognizes a written locus (writing gesture) indicating a written mistake and is configured such that it can recognize an alternative input written outside the inputting region of the hand-written information inputting paper sheet 8 as hand-written information to the inputting region. A flow of a written mistake process in the mobile terminal 5 configured in this manner is described with reference to a flow chart of FIG. 18.

Figure 18:
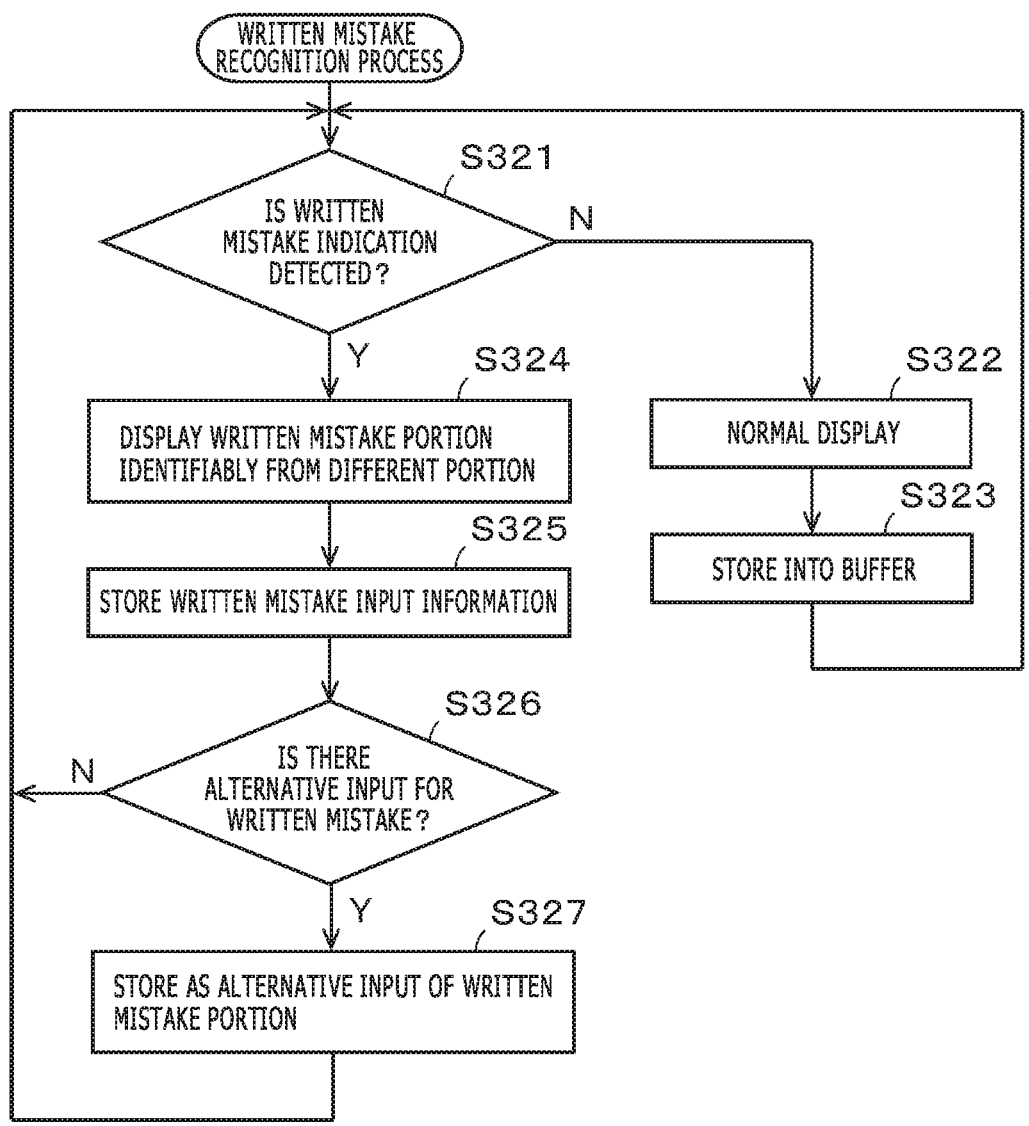
FIG. 18 is a flow chart illustrating an example of processing operations of the mobile terminal depicted in FIG. 15, according to one or more embodiments of the present disclosure.

In particular, in the example of FIG. 18, the control circuit 501 decides whether or not a writing locus indicating a written mistake is detected (S321). If it is decided at S321 that a writing locus indicating a written mistake is not detected, then the control circuit 501 displays hand-written information by the electronic pen 4 on the display screen as described hereinabove (S322) and stores the hand-written information into the filling data buffer 510 (S323). Then, the control circuit 501 returns the processing to S321.

If it is decided at S321 that a writing locus indicating a written mistake is detected, then the control circuit 501 displays the writing locus indicating the written mistake and input information indicated as the written mistake such that they can be identified, for example, by setting a specific flag to the writing locus indicating the written mistake such that the input information indicated as the written mistake is displayed by a different display color on the basis of presence or absence of the flag (S324). Then, the writing locus indicating the written mistake and the input information indicated as the written mistake are stored into the filling data buffer 510 (S325).

Then, the control circuit 501 decides whether or not there is an alternative input for input information indicated as written mistake (S326). This decision is performed by deciding whether or not the timestamp added to the alternatively inputted information indicates a time just after that of the timestamp of the writing locus indicating the written mistake or whether or not the coordinate position of the alternatively inputted information is in the proximity of the inputting region in which the input information indicated as the written mistake exists or by deciding both of them. It is to be noted that it is a matter of course that, if an alternative input is performed within the inputting region, then the alternative input is displayed as hand-written information to the inputting region and stored without being subjected to the processes of FIG. 18.

If it is decided at S326 that there is no alternative input for the input information indicated as the written mistake, then the control circuit 501 returns the processing to S321. On the other hand, if it is decided at S326 that there is an alternative input for the input information indicated as the written mistake, then the control circuit 501 refers to the attribute information of the inputting region to recognize the alternative input for the input information indicated as the written mistake as information to be inputted to the inputting region even if the alternative input is outside the inputting region and stores the alternative input into the filling data buffer 510 (S327). Then, the control circuit 501 returns the processing to S321.

In this manner, even if an alternative input is performed to the outside of the inputting region, information of the alternative input is recognized and stored as information to be written into the inputting region.

Further, where the mobile terminal 5 includes a character recognition engine that converts hand-written information into electronic data of characters or the like, by referring to attribute information of hand-written information to be inputted to each inputting region of a paper form, if the hand-written information is written in a mistake, then a notification representing this can be issued to the user. For example, although a numeral or a symbol is to be written into a filling region for a telephone number, if it is recognized that text, which is not a numeral or a symbol, is filled into the filling region, then this can be decided as a filling error.

Figure 19:
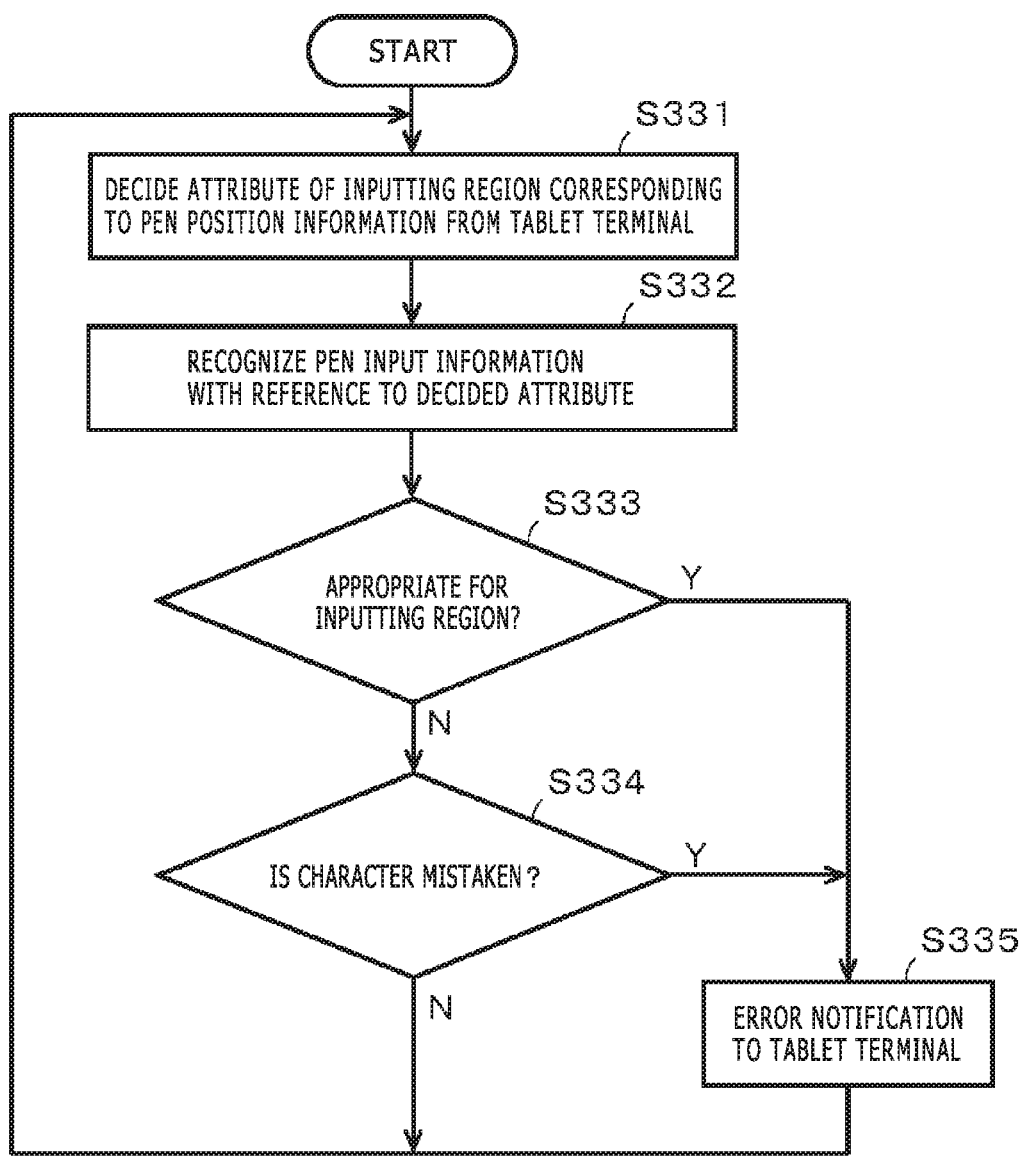
FIG. 19 is a flow chart illustrating an example of processing operations of the mobile terminal depicted in FIG. 15, according to one or more embodiments of the present disclosure.

FIG. 19 is a flow chart illustrating an example of a flow of processing by the mobile terminal 5 where the mobile terminal 5 is configured in such a manner as just described.

The control circuit 501 of the mobile terminal 5 decides, from position indication information by the electronic pen 4 from the tablet terminal 3, an attribute of an inputting region corresponding to the position indication information by the electronic pen 4 (S331).

Then, the control circuit 501 refers to the decided attribute of the inputting region to perform a recognition process for information hand-written by the electronic pen 4 into the inputting region to recognize, for example, character data and monitor whether or not there is an incorrect character or whether or not character data is appropriate for the inputting region (S332).

Then, the control circuit 501 decides whether or not the hand-written inputted character is appropriate for the inputting region (S333). If it is decided that the hand-written inputted character is not appropriate, then the control circuit 501 notifies the tablet terminal 3 of this (error notification) (S335). When the error notification is received, the tablet terminal 3 notifies the user of this by a beep sound.

On the other hand, if it is decided at S333 that the hand-written inputted character is appropriate for the inputting region, then the control circuit 501 decides whether or not the hand-written inputted character is a mistake (S334). If it is decided that the hand-written inputted character is a mistake, then the control circuit 501 notifies the tablet terminal 3 of this (error notification) (S335). When the tablet terminal 3 receives this error notification, it emits a beep sound to notify the user of the error notification. Then, after S334 and S335, the control circuit 501 returns its processing to S331 and repeats the processing operations beginning at S331.

By referring to attribute information corresponding to different inputting regions configuring a paper form, for input information transmitted from the tablet terminal 3, processing can be performed regarding the right for determining whether or not an input to each of inputting regions is permissible based on a pen ID assigned to an electronic pen used by an inputting person (writing person), such dependency between inputting regions that an input to a certain inputting region has a restricting effect to an input to a different inputting region and improvement in recognition accuracy or appropriateness of inputted information when character recognition or image recognition is performed.

It is to be noted that the character recognition process and the image recognition process described above with reference to FIGS. 18 and 19 in which a character recognition engine and an image recognition engine are used, respectively, can be performed similarly also in an electronic apparatus which includes a position detection device having a sensor on the front surface side or the rear surface side of the display screen without using a hand-written information inputting paper sheet.

Figure 20:
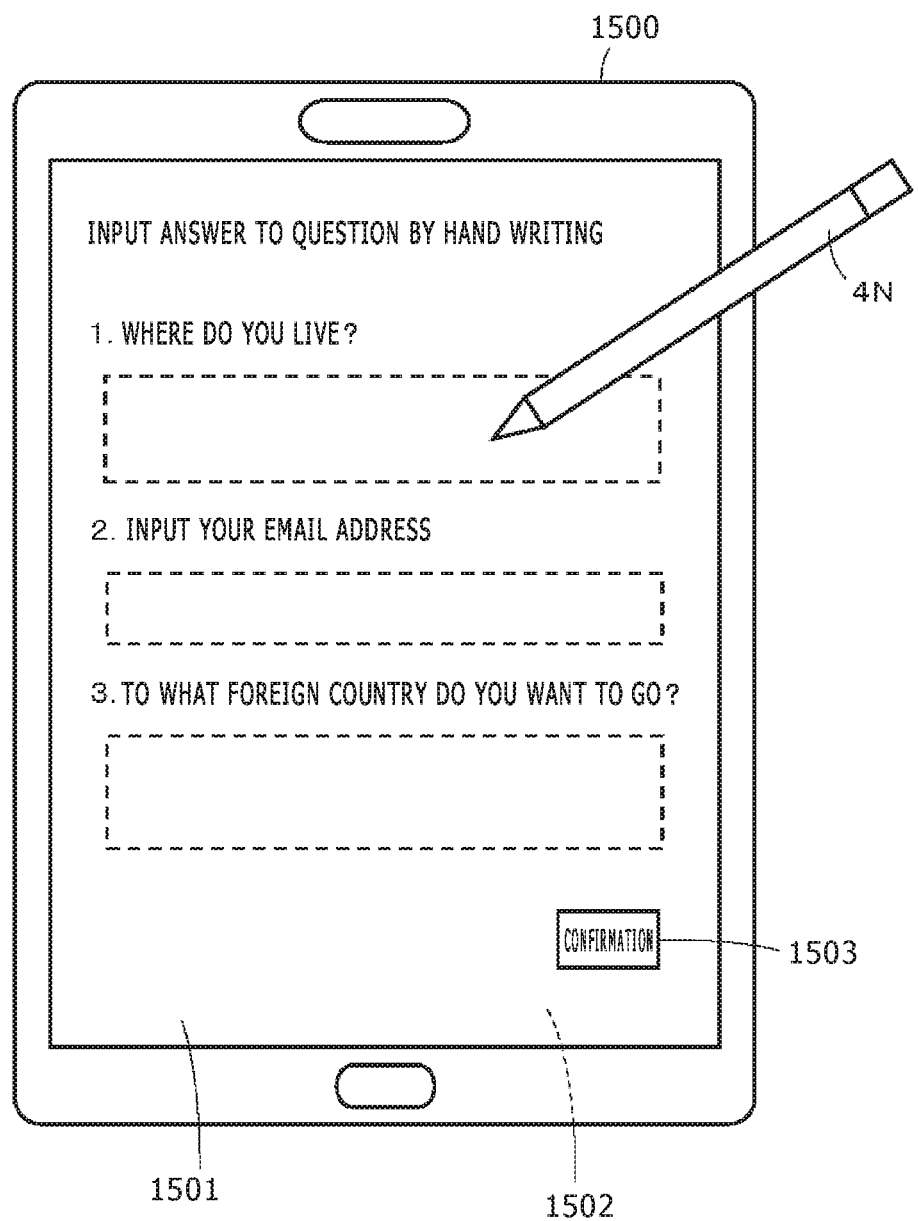
FIG. 20 is a view illustrating an example of processing operations of the mobile terminal depicted in FIG. 15, according to one or more embodiments of the present disclosure.

FIG. 20 depicts a pad type terminal 1500 as an example of an electronic apparatus of the type described above. Referring to FIG. 20, in the example depicted, a position detection device 1502 having a sensor is provided on the rear surface side of a display screen 1501. Thus, if position indication input is performed to the display screen 1501 using an electronic pen 4N belonging to the pad type terminal 1500, then the position detection device 1502 can detect the position indication input by the electronic pen 4N. In this case, the position detection device 1502 and the electronic pen 4N may be of the electromagnetic induction type or may be of the capacitance type in which the sensor is disposed on the front surface side of the display screen 1501. Further, in this case, the electronic pen 4N need not have a function as a ballpoint pen or a pencil for writing on a paper sheet.

The pad type terminal 1500 of the present example can accept hand-written information inputting by the electronic pen 4N and includes a character recognition engine or an image recognition engine that recognizes the inputted hand-written information as a character or an image.

In the example of FIG. 20, the pad type terminal 1500 is depicted in a state in which it acquires data of such a page form (corresponding to a paper form) as depicted in FIG. 20 from a predetermined server apparatus through a communication network and the data is displayed on the display screen 1501. The page form of the example of FIG. 20 requests hand-written information inputting, and the pad type terminal 1500 acquires coordinate region data of inputting regions for accepting hand-written information inputting and attribute information of the individual inputting regions in a form included in the data of the page form.

The user of the electronic pen 4N would perform hand-written information inputting according to writing items of a page form displayed on the display screen 1501 through the display screen 1501. It is to be noted that, in this case, a frame indicated by a broken line in FIG. 20 may be displayed on the display screen 1501 or may not be displayed. The user would perform hand-written information inputting to a region of a blank field of the display screen 1501 in response to an indication of a writing item of the page form.

At this time, the pad type terminal 1500 can perform processes similar to those described hereinabove with reference to FIGS. 18 and 19. In particular, when character recognition or image recognition is performed for hand-written information inputted to each inputting region, the pad type terminal 1500 refers to attribute information of an inputting region for performing hand-written information inputting.

In this case, although the processes described hereinabove with reference to FIG. 18 relate to an alternative input when a mistake is made in writing, in the example of FIG. 20, when a user performs hand-written information inputting to a blank field using the electronic pen 4N, even if the hand-written information protrudes from the inputting region of a coordinate range set in advance, by referring to information of a coordinate position, as attribute information, indicative of a position of an inputting region for performing hand-written information inputting to make a decision, it is possible, even if a plurality of inputting regions positioned in the proximity of each other are disposed, to specify, by comparison of coordinate positions of the plurality of inputting regions, an inputting region to which inputting is to be originally performed and associate the inputted hand-written information with the specified inputting region. Also it is possible to refer to information regarding whether or not a timestamp added to hand-written inputted information indicates a time just after time of a timestamp of an immediately preceding writing locus, to information regarding whether or not a coordinate position of alternatively inputted information is in the proximity of a set inputting region or to both information.

If the information to be inputted to an inputting region has attribute information indicating, for example, whether the information is a text or a numeral, then when character recognition of the hand-written information inputted to the inputting region is to be performed, the recognition rate can be improved by referring to the attribute information.

Further, if processes similar to those of FIG. 19 are performed and it is decided, for example, that a hand-written information input of the user is not an appropriate input, then such a countermeasure as to urge re-entering can be taken. It is to be noted that, in the example of FIG. 20, if the user clicks an icon 1503 for "confirmation" displayed on the display screen 1501, then it is possible to confirm whether or not hand-written information to each inputting region is appropriate.

<Modification to Tablet Terminal 3>

In the tablet terminal 3 described hereinabove, a hand-written information inputting paper sheet 8 is locked to an appropriate position of the receiving surface 3S with the position thereof regulated by a wall portion of the sensor cover 314 of the tablet terminal 3 such that the barcode as a paper ID can be read correctly by the barcode reader 32 as a reader device provided on the clip member 31.

However, the paper ID can be configured so as to be read by a different method. In this case, the tablet terminal does not include a position regulation member for a hand-written information inputting paper sheet 8. Alternatively, even if the tablet terminal includes a position regulation member, a paper form printed on a hand-written information inputting paper sheet 8 and the coordinate position of the position detection device of the tablet terminal are sometimes displaced from each other.

Therefore, a tablet terminal described below is configured such that, even if a hand-written information inputting paper sheet 8 placed on the receiving surface 3S and the coordinate position of the position detection device are displaced from each other, the mobile terminal can recognize hand-written information as hand-written information in an original inputting region of the paper form.

Figure 21:
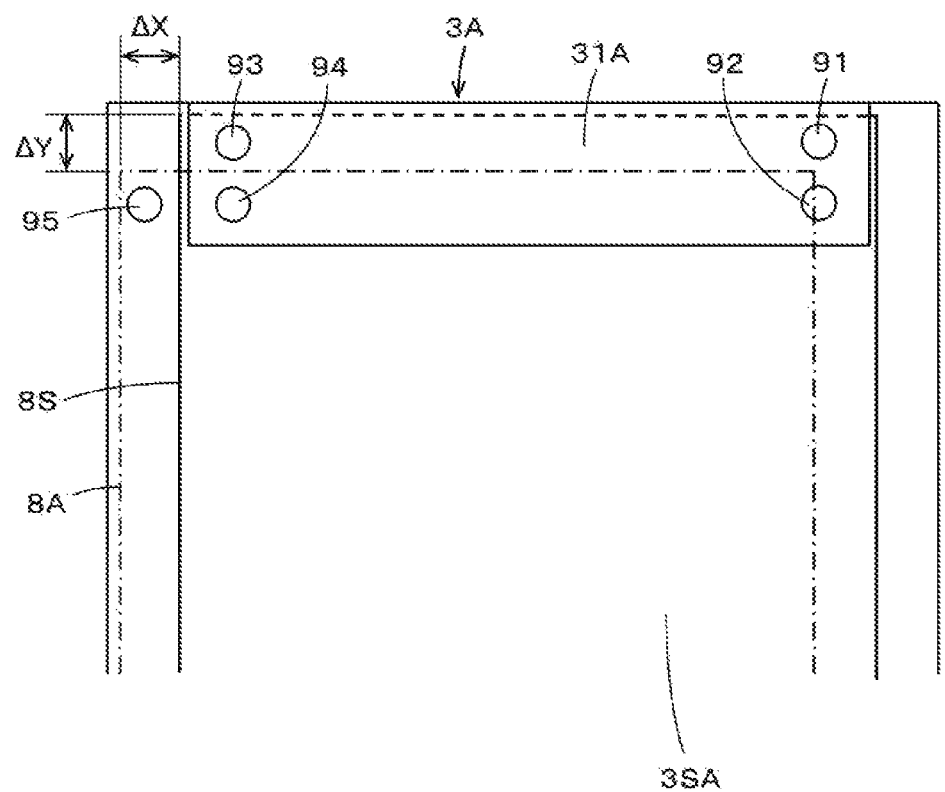
FIG. 21 is a view depicting part of a different tablet terminal which configures the hand-written information inputting apparatus depicted in FIG. 1, according to one or more embodiments of the present disclosure.

FIG. 21 depicts an example of a configuration of part of a tablet terminal 3A configured in such a manner as described above. In the tablet terminal 3A, a plurality of, in this example, five sensors 91, 92, 93, 94 and 95 that detect a displacement of the placement position of the hand-written information inputting paper sheet 8A on a receiving surface 3SA of the tablet terminal 3A are provided as a placement position detection circuit that detects whether or not the placement position is appropriate. In the present example, each of the sensors 91 to 95 is configured from an optical sensor.

Further, the sensors 91 and 92 are disposed in an upwardly and downwardly juxtaposed relationship with each other at a right end of a clip member 31A of the tablet terminal 3A. Meanwhile, the sensors 93 and 94 are provided in an upwardly and downwardly juxtaposed relationship with each other at a left end of the clip member 31A of the tablet terminal 3A. Further, the sensor 95 is disposed at a position on the outer side of the clip member 31A on the receiving surface 3SA of the tablet terminal 3A.

The sensors 91 to 94 are each configured from a light source and a light receiving circuit between which light is intercepted by a paper sheet locked by the clip member 31A similarly to the paper sheet mount sensor 39 described hereinabove. Meanwhile, the sensor 95 is formed from an optical sensor which can detect, when it is covered with a paper sheet, this. The disposition distances between the sensors 91 to 95 is determined in advance and known.

In the present example, displacement of a paper sheet is detected with reference to the left end of the paper sheet, and the sensors 93, 94 and 95 on the left side are for detecting the left edge of the paper sheet and detecting an upward and downward displacement of the paper sheet. Meanwhile, the sensors 91 and 92 on the right side are for detecting no inclination of a right portion with reference to the left end of the paper sheet.

In the present example, displacement of the placement position of a hand-written information inputting paper sheet 8A placed on the receiving surface 3SA from a matching position with the coordinate position of the position detection device of the tablet terminal 3A indicated by a solid line 8S in FIG. 21 can be detected by the five sensors 91 to 95 described above. For example, if a hand-written information inputting paper sheet 8A is placed at such a position as indicated by a dash-dotted line in FIG. 21, then $(\Delta X, \Delta Y)$ is obtained as an offset value of the positional displacement from sensor outputs from the sensors 91 to 95. Further, at least one of the sensors 91 to 94 functions as a paper sheet placement presence/absence detection circuit that detects whether or not a hand-written information inputting paper sheet 8A is placed on the receiving surface 3SA. Further, the tablet terminal 3A includes a processing circuit by which, when it is detected by the paper sheet placement presence/absence detection circuit that a hand-written information inputting paper sheet 8A is not placed on the receiving surface 3SA, operation of the position detection device is stopped or display, on the display device, of information of the position indicated by the electronic pen 4 and detected by the position detection device is disabled to prevent, when no hand-written information inputting paper sheet 8A is placed on the receiving surface 3SA, information of the position indicated by the electronic pen 4 from being displayed on the display device.

Therefore, the tablet terminal 3A of the present example adds or subtracts the offset value $(\Delta X, \Delta Y)$ of the positional displacement to or from the coordinate of the indicated position by the electronic pen 4 detected by the position detection device to perform a correction process for the detection position and then transmits the corrected coordinate to the mobile terminal 5. Also it is possible to transmit the sensor outputs to the mobile terminal 5 such that a correction process for the detection position can be performed by the mobile terminal 5. The mobile terminal 5 decides to which inputting region of the paper form the input information is inputted on the basis of the coordinate information at the position indicated by the electronic pen 4 and corrected with the offset value $(\Delta X, \Delta Y)$ of the positional displacement taken into consideration. Accordingly, even if a hand-written information inputting paper sheet 8A is placed on the receiving surface 3SA of the tablet terminal 3A in a state in which the hand-written information inputting paper sheet 8A has a positional displacement from the coordinate position of the position detection device of the tablet terminal 3A, the mobile terminal 5 can correctly decide to which inputting region of the paper form the hand-written information is inputted appropriately.

[Other Embodiments or Modifications]

In the tablet terminal 3 of the embodiment described above, it is detected by the paper sheet mount sensor 39 that a hand-written information inputting paper sheet 8 is placed on the receiving surface 3S and locked by the clip member 31. However, also it is possible to detect whether or not a hand-written information inputting paper sheet 8 is placed on the receiving surface 3S and locked by the clip member 31 by monitoring whether or not a barcode can normally be read by the barcode reader 32 which configures an example of the reader device. In this case, it can be detected similarly that the paper sheet is replaced. Also it is possible to configure a tablet terminal such that it monitors in a standby state whether or not a barcode is read successfully by the barcode reader 32 and, when a barcode is read successfully, the main power supply is turned on.

Further, in the embodiment described hereinabove, it is detected by the paper sheet mount sensor 39 that a hand-written information inputting paper sheet 8 is placed on the receiving surface 3S and locked by the clip member 31. However, the tablet terminal 3 may otherwise be configured such that a sensor that detects an open or closed state of the clip member 31 is provided such that, when the clip member 31 is opened and closed, it is detected by the sensor that a hand-written information inputting paper sheet 8 is mounted and then reading of the barcode is performed by the barcode reader 32.

For example, in a hospital or the like, a variety of document forms such as interview sheets, consent forms or acceptance forms for a surgical operation or inspection and round records are used. Such document forms have inputting regions for hand-written inputting by a patient, a nurse or a doctor. In this case, since an electronic pen to be used by each of a patient, a nurse and a doctor is an electronic pen owned by each of them, each person has a pen ID unique to the person. Therefore, also in the same one paper form, hand-written information can be inputted by electronic pens of different pen IDs. Where electronic pens of different pen IDs are used, in the embodiment described hereinabove, since hand-written information inputs are transmitted in an associated relationship with the pen IDs to a mobile terminal, the mobile terminal can display the hand-written information in different display modes such that, for example, character colors different from each other are assigned to the different pen IDs. Therefore, it can be discriminated readily an electronic pen of which pen ID is used for inputting.

Further, where a person who is to input hand-written information to each inputting region provided in a paper form is limited, by allocating information for limiting a person who is to input hand-written information as attribute information of the inputting region, also it is possible not to distinctively display hand-written inputted information in accordance with a pen ID as described above but to change the display mode such as a display color of hand-written information for each inputting region.

It is to be noted that, although it can be decided from attribute information of an inputting region that a signature is to be inputted to the inputting region, it is preferable to perform, for hand-written information in the inputting region to which a signature is to be inputted, such a process as encryption for security measures and store the thus processed signature into a database. Attribute information indicating that a data transfer process is to be performed after an encryption process is performed may be registered in an associated relationship with the inputting region to which a signature is to be inputted.

Further, in the embodiment described above, when a plurality of hand-written information inputting paper sheets 8 are to be divided into groups, the grouping is based on an ending instruction of a tablet terminal. However, upon registration into the server apparatus 1 in advance, a plurality of pages of hand-written information inputting paper sheets 8 may be registered as one group. In this case, the mobile terminal does not permit an ending instruction from the tablet terminal until hand-written information inputting to the plurality of pages of hand-written information inputting paper sheets 8 is completed.

It is to be noted that, while, in the embodiment described hereinabove, the hand-written information inputting apparatus is configured from a combination of a tablet terminal and a mobile terminal, also it is possible to configure the hand-written information inputting apparatus as a unitary apparatus having the functions of both terminals. The display screen in this case may be common to the receiving surface or may be formed as a separate region from the receiving surface. Where the display screen and the receiving surface are formed common, namely, where a paper sheet is placed on the display screen, it is possible to confirm input information displayed on the display screen in such a manner as to flip the paper sheet.

It is to be noted that, while, in the embodiment described hereinabove, an apparatus that accepts registration of a paper form and an apparatus that stores hand-written information input information are the same server apparatus, it is a matter of course that they can be configured otherwise as apparatus separate from each other.

Further, while, in the hand-written information inputting apparatus of the embodiment described above, an apparatus connected to a tablet terminal is a mobile terminal, the apparatus may otherwise be, for example, a personal computer installed fixedly. Further, the apparatus connected to the tablet terminal may be configured from an apparatus which has the functions of the mobile terminal described hereinabove and of the server apparatus 1, which includes a paper form database and a paper filled data storage device, which exchange information to and from the mobile terminal.

Further, a section of the server apparatus 1 which includes a paper form database and a paper display information provision circuit and a section of the server apparatus 1 which includes a storage processing circuit and a paper filled data storage device may be different apparatus from each other.

Further, while the electronic pen and the tablet terminal in the embodiment described hereinabove are of the electromagnetic induction type, it is a matter of course that they may otherwise be of the capacitance type or of a different coupling type.

Further, the configuration of the clip member of the tablet terminal is not limited to that of the example in the embodiment described above, but may be any configuration if it holds down and locks or fixes a paper sheet.

Further, it is not essential to provide the reader device for a paper ID on the clip member, but also it is possible to provide the reader device (for example, a barcode reader), for example, on a tablet terminal through a cable such that the paper ID (barcode) of a paper sheet is read by the reader device (barcode reader).

Further, the barcode is an example of a paper ID, and any reading apparatus can be used if it can identify a hand-written information inputting paper sheet.

While a preferred embodiment of the present disclosure have been described using specific terms, such description is for illustrative purposes only, and it is to be understood that changes and variations may be made without departing from the spirit or scope of the following claims.

What is claimed is:

1. A hand-written information inputting method for inputting hand-written information on a paper sheet, by using a hand-written information inputting apparatus including a hand-written input device and an information processing device coupled to the hand-written input device, the hand-written input device including a receiving surface which, in operation, receives a paper sheet on which a document form is printed, the document form including a writing region for hand-written input and identification information that identifies the document form, an identification information reader device that reads the identification information, and a position detecting device, the method comprising:
    sending, by the hand-written input device, the identification information printed on the paper sheet and read by the identification information reader device to the information processing device, when the paper sheet is placed on the receiving surface, and
    detecting, by the hand-written input device, information regarding a position indicated by an electronic pen that visibly writes on the paper sheet, in response to a hand-written inputting operation to the paper sheet placed on the receiving surface by the electronic pen;
    determining, by the information processing device, based on the identification information from the hand-written input device, whether document form information that corresponds to the document form printed on the paper sheet is acquirable, the document form information enabling the information processing device to display the document form, and
    delivering, by the information processing device, a preparation completion notice to the hand-written input device in response to determining that the document form information is acquirable; and
    delivering, by the hand-written input device, the information regarding the position indicated by the electronic pen and detected by the position detecting device to the information processing device in response to receiving the preparation completion notice from the information processing device; and
    changing, by the hand-written input device, a display state of a light emitting device in response to receiving the preparation completion notice from the information processing device.

2. The hand-written information inputting method according to claim 1, further comprising:
    detecting, by the hand-written input device, whether the paper sheet is placed on the receiving surface; and
    reading, by the identification information reader device, the identification information in response to detecting that the paper sheet is placed on the receiving surface,
    wherein the identification information reader device does not read the identification information in response to detecting that the paper sheet is not placed on the receiving surface.

3. The hand-written information inputting method according to claim 1,
    wherein the hand-written input device includes a clip which, in operation, locks the paper sheet to the receiving surface, and
    wherein the identification information reader device is disposed on a surface of the clip that is opposite a surface of the paper sheet on which the document form is printed.

4. A hand-written information inputting apparatus comprising:
    a hand-written input device;
    an information processing device coupled to the hand-written input device,
    wherein the hand-written input device includes:
        a receiving surface which, in operation, receives a paper sheet on which a document form is printed, the document form including a writing region for hand-written input and identification information that identifies the document form,
        a position detecting device which, in operation, detects information regarding a position indicated by an electronic pen that visibly writes on the paper sheet, in response to a hand-written inputting operation to the paper sheet placed on the receiving surface by the electronic pen, and
        an identification information reader device which, in operation, reads the identification information printed on the paper sheet in response to the paper sheet placed on the receiving surface and sends the read identification information to the information processing device,
    wherein the information processing device includes:
        a determining circuit which, in operation, determines, based on the identification information from the hand-written input device, whether document form information that corresponds to the document form printed on the paper sheet is acquirable, the document form information enabling the information processing device to display the document form, and
        a delivery circuit which, in operation, delivers to the hand-written input device a preparation completion notice in response to the determining circuit determining that the document form information is acquirable, and
    wherein the hand-written input device does not deliver the information regarding the position indicated by the electronic pen to the information processing device unless the preparation completion notice is received from the information processing device; and
    an indicating circuit which, in operation, changes a display state of a light emitting device in response to receiving the preparation completion notice from the information processing device.

5. The hand-written information inputting apparatus according to claim 4,
    wherein the information processing device includes a display device which, in operation, displays the document form based on the document form information.

6. The hand-written information inputting apparatus according to claim 4,
    wherein the hand-written input device includes a paper sheet placement detecting circuit which, in operation, detects whether the paper sheet is placed on the receiving surface, and wherein the identification information reader device does not read the identification information in response to the paper sheet placement detecting circuit detecting that the paper sheet is not placed on the receiving surface.

7. The hand-written information inputting apparatus according to claim 4,
   wherein the hand-written input device includes a clip which, in operation, locks the paper sheet to the receiving surface, and
   wherein the identification information reader device is disposed on a surface of the clip that is opposite a surface of the paper sheet on which the document form is printed.

8. The hand-written information inputting apparatus according to claim 7, further comprising:
   a detection circuit which, in operation, detects whether the paper sheet is locked to the receiving surface by the clip;
   wherein the identification information reader device starts reading the identification information in response to the detection circuit detecting that the paper sheet is locked to the receiving surface by the clip.

9. The hand-written information inputting apparatus according to claim 7, further comprising:
   a placement position detecting circuit including a plurality of sensors disposed on the clip,
   wherein each sensor of the plurality of sensors, in operation, detects whether the sensor is covered by the paper sheet, and
   wherein the position detecting circuit, in operation, obtains an offset value of a positional displacement of the paper sheet placed on the receiving surface based on a plurality of sensor outputs received from the plurality of sensors.

10. The hand-written information inputting apparatus according to claim 9, further comprising:
    a positional information correcting circuit which, in operation, corrects information of the position indicated by the electronic pen based on the offset value of the positional displacement of the paper sheet placed on the receiving surface obtained by the placement position detecting circuit.

11. The hand-written information inputting apparatus according to claim 9, further comprising:
    a positional information correcting circuit which, in operation, corrects information of the position indicated by the electronic pen based on the offset value of the positional displacement of the paper sheet placed on the receiving surface obtained by the placement position detecting circuit,
    wherein the information, corrected by the positional information correcting circuit, of the position indicated by the electronic pen is displayed together with the document form information.

12. The hand-written information inputting apparatus according to claim 4,
    wherein the document form information corresponding to the document form printed on the paper sheet includes positional information that specifies the writing region included in the document form, and
    wherein the information processing device holds the writing region included in the document form and the information of the position indicated by the electronic pen and detected by the position detecting device of the hand-written input device in association with each other based on the positional information.

13. The hand-written information inputting apparatus according to claim 12,
    wherein the information processing device includes a notification circuit which, in operation, issues a notification of blank in a case where there is no information available of the position indicated by the electronic pen and detected by the position detecting device of the hand-written input device in association with the writing region included in the document form.

14. The hand-written information inputting apparatus according to claim 13,
    wherein the document form information corresponding to the document form printed on the paper sheet includes attribute information of hand-written information input in the writing region included in the document form, and
    wherein the information processing device includes:
       a deciding circuit which, in operation, decides whether the hand-written information input in the writing region corresponds to the attribute information, and
       a notification circuit which, in operation, issues a notification indicating that the hand-written information input in the writing region does not correspond to the attribute information, based on a decided result from the deciding circuit.

15. The hand-written information inputting apparatus according to claim 4,
    wherein the hand-written input device and the information processing device are separate from each other.

* * * * *